(12) United States Patent
Ishida et al.

(10) Patent No.: US 6,834,316 B1
(45) Date of Patent: Dec. 21, 2004

(54) DATA TRANSFER CONTROLLER AND ELECTRONIC DEVICE

(75) Inventors: Takuya Ishida, Sapporo (JP); Yoshiyuki Kamihara, Sapporo (JP); Fumitoshi Wada, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/582,290

(22) PCT Filed: Oct. 26, 1999

(86) PCT No.: PCT/JP99/05903

§ 371 (c)(1),
(2), (4) Date: Aug. 14, 2000

(87) PCT Pub. No.: WO00/25216

PCT Pub. Date: Apr. 5, 2000

(30) Foreign Application Priority Data

Oct. 27, 1998 (JP) .......................... 10-321540

(51) Int. Cl.[7] .............................................. G06F 13/00
(52) U.S. Cl. ................................................ 710/62; 2/3
(58) Field of Search .............................. 710/30, 2, 3, 4, 710/58, 60, 62

(56) References Cited

U.S. PATENT DOCUMENTS

| | | | |
|---|---|---|---|
| 5,758,089 A | | 5/1998 | Gentry et al. |
| 5,875,313 A | * | 2/1999 | Sescila et al. .............. 710/305 |
| 5,983,301 A | | 11/1999 | Baker et al. |
| 6,131,119 A | * | 10/2000 | Fukui .......................... 709/224 |
| 6,157,972 A | * | 12/2000 | Newman et al. ............. 710/100 |
| 6,578,095 B1 | * | 6/2003 | Tanaka et al. ............... 710/100 |

FOREIGN PATENT DOCUMENTS

| | | |
|---|---|---|
| JP | A-9-266485 | 10/1997 |
| JP | A-10-40211 | 2/1998 |
| JP | A-10-285223 | 10/1998 |
| JP | A-11-17773 | 1/1999 |
| WO | WO 98/44400 | * 10/1998 |

OTHER PUBLICATIONS

Nikkei Electronics 1997 9.8 (No. 698), "Direct Connection of Digital Steel Cameras: Connecting Different Type of Machines by Standardization", pp. 107–111.
"An outline of the IEEE 1394 High Performance Serial Bus" (*Interface, Apr. 1996, pp. 1–10*).
"Bus Standards for PC Peripheral Equipment" (*Interface*, Jan. 1997, pp. 106–116).
"Real–Time Transfer Modes and Multimedia–Capable Protocols for IEEE 1394–1995 (FireWire)" (*Interface*, Jan. 1997, pp. 136–146).

* cited by examiner

*Primary Examiner*—Fritz Fleming
(74) *Attorney, Agent, or Firm*—Oliff & Berridge, PLC

(57) ABSTRACT

The objective is to provide a data transfer control device and electronic equipment that make it possible to utilize the resources possessed by each node efficiently, thus reducing processing overheads. A packet shaping circuit receives a self-ID packet conforming to the IEEE 1394 standard from each of the nodes, shapes a packet having a frame made of a single header and data that is formed from an assembled series of self-ID packets, and interfaces with an upper layer. Parity information is erased from each self-ID packet, data of the packet is formed from these assembled self-ID packets without the parity information, and also error status information is appended to a trailer of parity information. The header of the packet is written to a header area and the data thereof is written to a data area, and also a data pointer indicating the address of the data is appended to the header of the packet. An area that is dedicated to self-ID packets is provided in the data area. The data transfer control device detects whether or not the current period is a self-ID period, and regards packets that are sent in during that self-ID period as self-ID packets, for performing packet shaping.

35 Claims, 24 Drawing Sheets

THIS EMBODIMENT OF THE PRESENT INVENTION

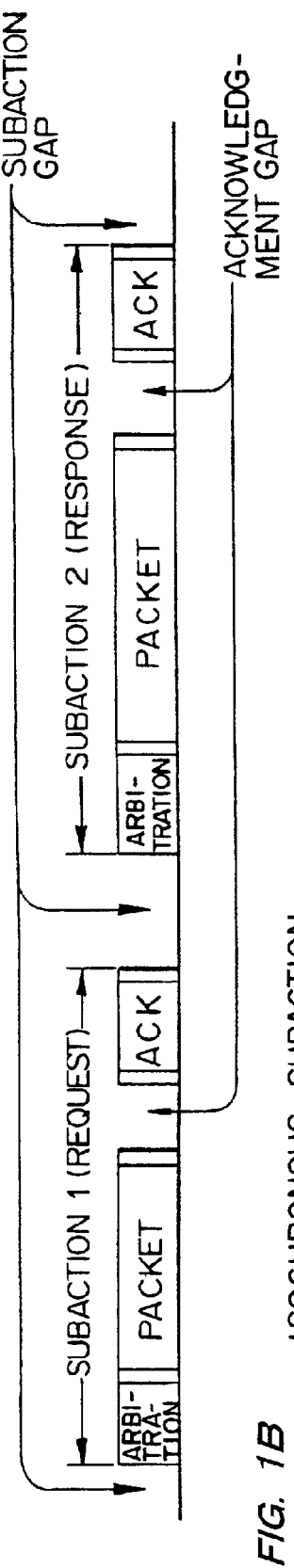
FIG. 1A ASYNCHRONOUS SUBACTION
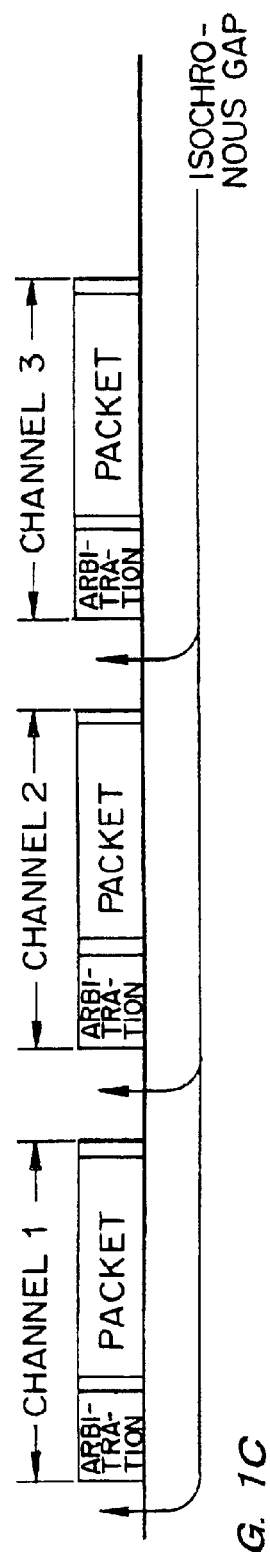
FIG. 1B ISOCHRONOUS SUBACTION
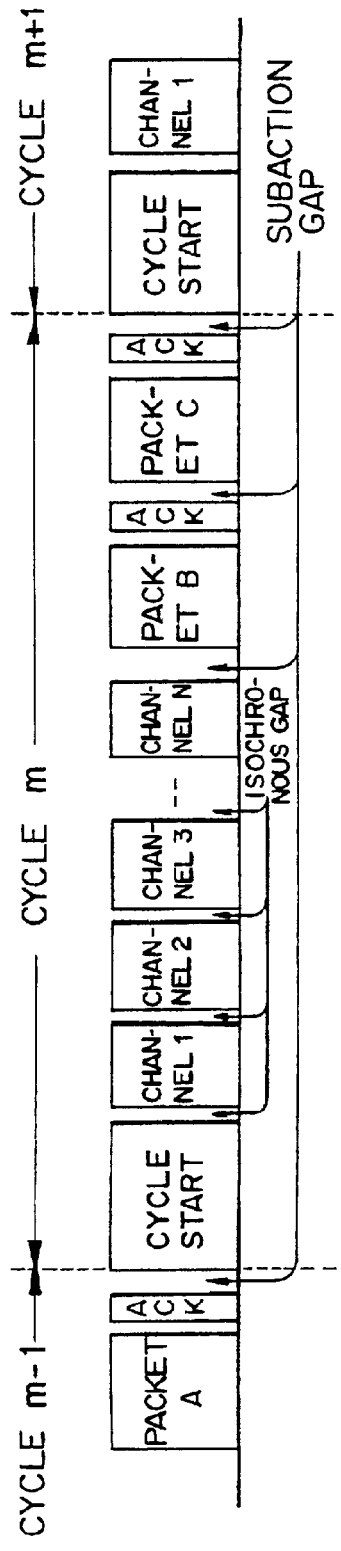
FIG. 1C

FIG. 4A

SELF-ID PACKET #0

| b.31 | | | | | | | | | | | | b.0 |
|---|---|---|---|---|---|---|---|---|---|---|---|---|
| 0 | 10 | PHY_ID | 0 | L | gap_cnt | sp | del | C | pwr | p0 | p1 | p2 | i | m |
| 1 | INVERSION OF FIRST 32 BITS ||||||||||||

FIG. 4B

SELF-ID PACKETS #1, #2, #3

| b.31 | | | | | | | | | | | | | b.0 |
|---|---|---|---|---|---|---|---|---|---|---|---|---|---|
| 0 | 10 | PHY_ID | 1 | n | rsv | pa | pb | pc | pd | pe | pf | pg | ph | r | m |
| 1 | INVERSION OF FIRST 32 BITS |||||||||||||

FIG. 4C

LINK-ON PACKET

| b.31 | | | | | | | | b.0 |
|---|---|---|---|---|---|---|---|---|
| 0 | 01 | PHY_ID | 0000 | 0000 | 0000 | 0000 | 0000 | 0000 |
| 1 | INVERSION OF FIRST 32 BITS ||||||||

FIG. 4D

PHY CONFIGURATION PACKET

| b.31 | | | | | | | | | b.0 |
|---|---|---|---|---|---|---|---|---|---|
| 0 | 00 | PHY_ID | R | T | gap_cnt | 0000 | 0000 | 0000 | 0000 |
| 1 | INVERSION OF FIRST 32 BITS |||||||||

COMPARATIVE EXAMPLE

THIS EMBODIMENT OF THE PRESENT INVENTION

RAM
(PACKET STORAGE MEMORY)

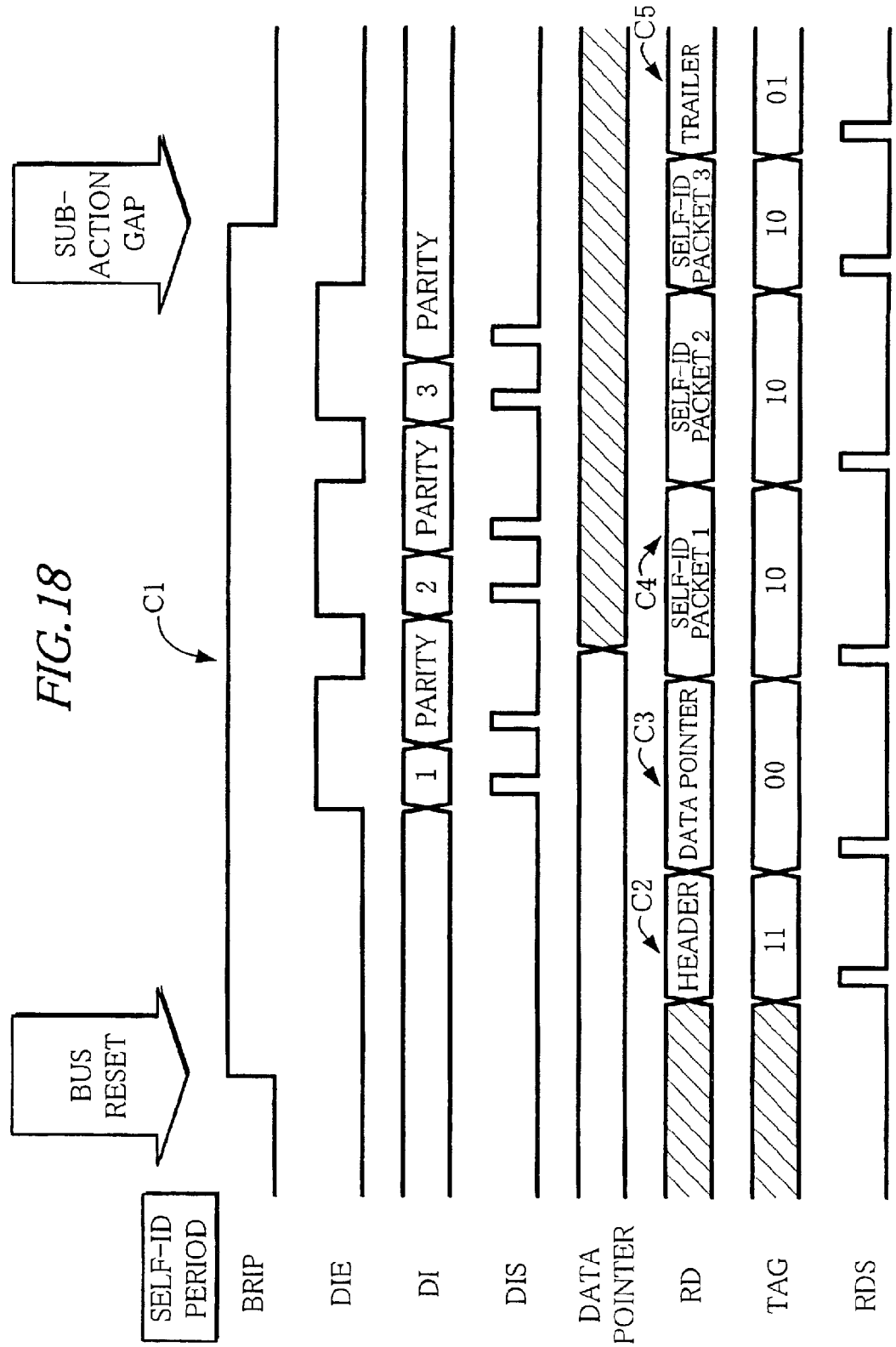

CTL WHILE PHY CHIP DRIVES

| CTL | NAME |
|-----|------|
| 0 0 | IDLE |
| 0 1 | STATUS |
| 1 0 | RECEIVE |
| 1 1 | GRANT |

STATUS BITS

| BIT | NAME |
|-----|------|
| 0 | ARBITRATION RESET GAP |
| 1 | SUBACTION GAP |
| 2 | BUS RESET |
| 3 | PHY INTERRUPT |
| 4 TO 7 | ADDRESS |
| 8 TO 15 | DATA |

FIG. 21

| TAG (DTAG) | MEANING |
|---|---|
| 0 0 | HEADER |
| 0 1 | TRAILER |
| 1 0 | DATA |
| 1 1 | START |

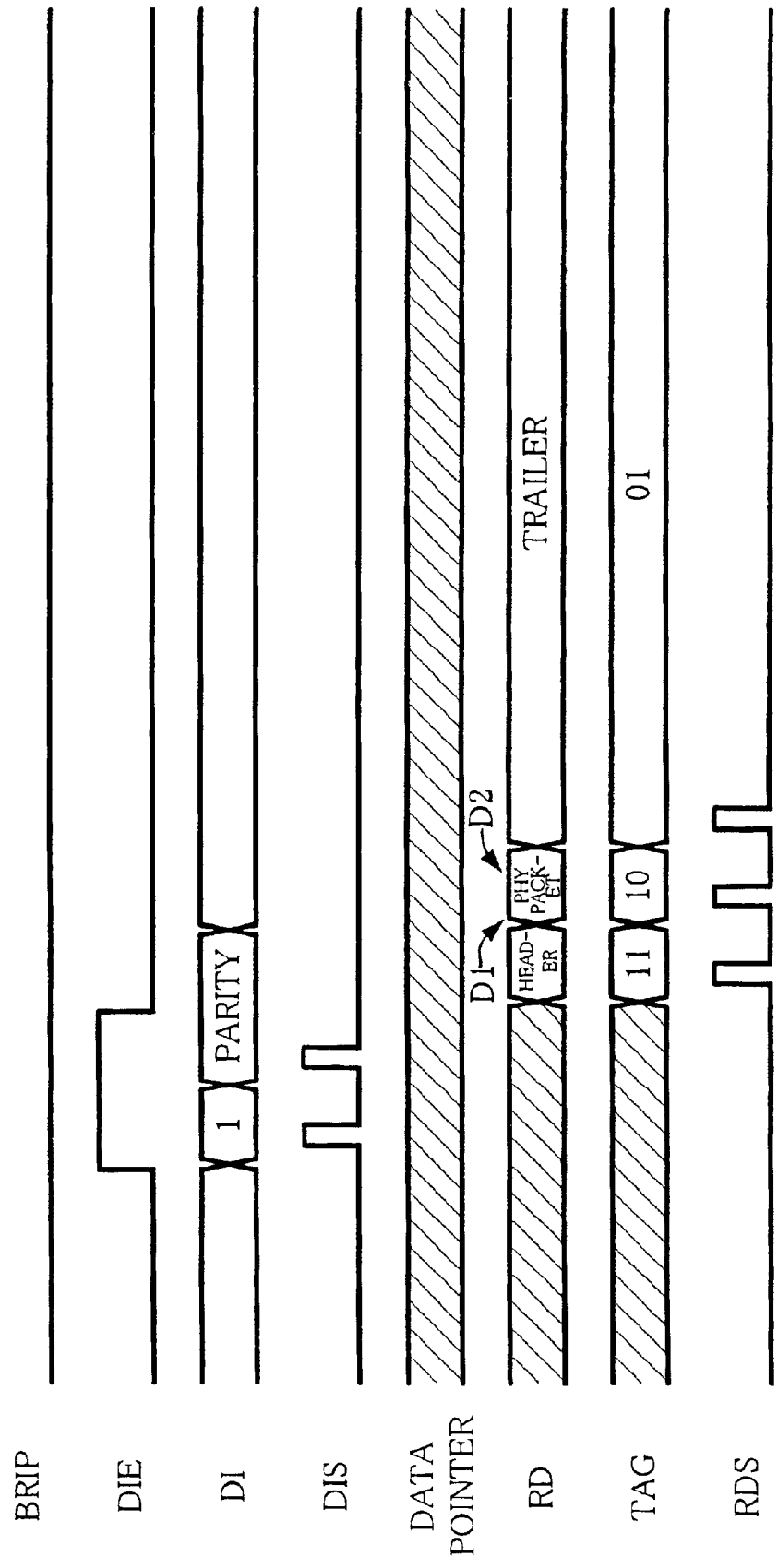

DATA TRANSFER CONTROLLER AND ELECTRONIC DEVICE

TECHNICAL FIELD

The present invention relates to a data transfer control device and electronic equipment comprising the same.

BACKGROUND OF ART

An interface standard called IEEE 1394 has recently been attracting much attention. This IEEE 1394 has standardized high-speed serial bus interfaces that can handle the next generation of multimedia devices. IEEE 1394 makes it possible to handle data that is required to have real-time capabilities, such as moving images. A bus in accordance with IEEE 1394 can be connected not only to peripheral equipment for computers, such as printers, scanners, CD-R drives, and hard disk drives, but also to domestic appliances such as video cameras, VTRs, and TVs. This standard is therefore expected to enable a dramatic acceleration of the digitalization of electronic equipment.

The concept of IEEE 1394 is disclosed in various publications, such as "An outline of the IEEE 1394 High Performance Serial Bus" (*Interface*, April 1996, pages 1 to 10), "Bus Standards for PC Peripheral Equipment" (*Interface*, January 1997, pages 106 to 116), and "Real-Time Transfer Modes and Multimedia-Capable Protocols for IEEE 1394-1995 (FireWire)" (*Interface*, January 1997, pages 136 to 146). Texas Instruments' TSB12LV31 is known as a data transfer control device that conforms to IEEE 1394.

IEEE 1394 specifies that, after a bus reset, tree identification and then self identification are performed. During this self identification, each node broadcasts its own self-ID packet to all the other nodes. Each node that receives this self-ID packet retains it in its own memory as necessary.

However, the number of these self-ID packets increases as the number of nodes increases, so it can become extremely large. In addition, it is necessary to append a header of at least one quadlet to distinguish this large number of self-ID packets from other LINK packets and enable an interface with respect to an upper layer in the firmware or the like. The existence of this large number of self-ID packets will cause a reduction in the free capacity of the memory of each node, raising a problem concerning the efficient usage of the resources possessed by each node.

To improve the actual transfer speed of the entire system in an data transfer control device conforming to IEEE 1394, it is preferable to reduce the processing overheads of firmware and application software running on the CPU, as far as possible.

DISCLOSURE OF THE INVENTION

The present invention was devised in the light of the above described technical problem, and has as an objective thereof the provision of a data transfer control device and electronic equipment using the same which are capable of efficiently utilizing the resources available to each node.

Another objective of the present invention is the provision of a data transfer control device and electronic equipment using the same which are capable of reducing the processing overheads of firmware and application software.

In order to solve the above described technical problems, the present invention relates to a data transfer control device for transferring data among a plurality of nodes that are connected to a bus, the data transfer control device comprising: packet shaping(reforming) means for receiving a series of self-identification packets that are transferred from the nodes, and shaping the transferred series of the self-identification packets into a packet having a frame made of control information that is used by an upper layer and data that is formed from an assembly of the transferred series of the self-identification packets; and write means for writing the shaped packet to a storage means.

In the present invention, a packet can be shaped (reformed) by re-packaging the series of self-identification packets into a single packet and appending control information, so that the series of self-identification packets can interface with an upper layer. This makes it possible to reduce the amount of storage area within the storage means required for writing the thus-shaped packet, in comparison with an upper-layer interface wherein control information is appended to each self-identification packet. In addition, since the series of self-identification packets is handled together, the processing overhead on the firmware or the like can be reduced.

In the present invention, the packet shaping means may erase error check information within each of the self-identification packets when each of the self-identification packets comprises error check information, and shapes the transferred series of the self-identification packets into a packet having a frame made of data formed from an assembly of the self-identification packets each of which error check information has been erased, and the control information. This makes it possible to further reduce the amount of storage area in the storage means for writing the thus-shaped packet.

In the present invention, the packet shaping means may determine whether or not there is an error in the self-identification packets that are transferred from the nodes, based on the error check information, and appends status information to control information of the packet to indicate whether or not there is an error in the self-identification packets. This makes it possible to convey to an upper layer that there is an error in a self-identification packet, in a simple manner.

In the present invention, the packet shaping means may append status information to control information of the packet to indicate whether or not the self-identification packets were received during a self-identification period. This makes it simple to distinguish between a packet obtained by re-packaging self-identification packets and other types of packet.

The data transfer control device of the present invention may further comprise: packet division means for writing control information of the packet into a control information area of the storage means and data of the packet into a data area of the storage means, the storage means being randomly accessible and being divided into the control information area and the data area; and means for appending a data pointer indicating an address of data to be written to the data area, to the control information. This makes it possible to handle the control information portion and the data portion of the thus-shaped packet separately, thus reducing the processing overheads on the firmware or the like.

In the data transfer control device of the present invention, the packet division means may write data of the packet obtained by shaping the series of the self-identification packets into an area within the storage means that is dedicated to self-identification packets. This makes it possible to simplify the processing required for, for example, the creation of a topology map.

The data transfer control device of the present invention may further comprise means for detecting whether or not the current period is a self-identification period, based on status information that has been sent from a lower layer; and the packet shaping means may regard a series of packets that have been transferred in during the self-identification period as self-identification packets, and may shape the series of the self-identification packets. This helps reduce the size of the hardware by making it possible to detect whether or not a packet to be processed is a self-identification packet, in a simple manner.

Note that in the present invention, dada transfer may be performed in accordance with the IEEE 1394 standard.

Electronic equipment in accordance with the present invention comprises any one of the above described data transfer control devices; a device for performing given processing on data that has been received from another node via the data transfer control device and the bus; and a device for outputting or storing data that has been subjected to the processing. Electronic equipment in accordance with the present invention further comprises: any one of the above described data transfer control devices; a device for performing given processing on data that is to be sent to another node via the data transfer control device and the bus; and a device for fetching data to be subjected to the processing.

With the present invention, it may be possible to speed up the processing performed within the electronic equipment for outputting or storing data that has been transferred from another node, or the processing performed within the electronic equipment on data that has been fetched thereby and is to be transferred to another node. The present invention can make it possible to reduce the size of the storage means used for storing the shaped packets and also reduces the processing load on the firmware or the like that controls the data transfer, thus making it possible to produce electronic equipment that is less expensive and more compact.

BRIEF DESCRIPTION OF THE DRAWINGS

FIGS. 1A, 1B, and 1C are illustrative of the concepts of asynchronous transfer and isochronous transfer.

FIGS. 4A, 4B, 4C, and 4D show the formats of physical-layer packets such as a self-ID packet.

FIG. 18 is a timing waveform chart illustrating a detailed example of the processing of packet shaping during the self-ID period.

FIG. 21 illustrates tags.

FIG. 22 is a timing waveform chart illustrating a detailed example of the processing of packet shaping outside of the self-ID period.

BEST MODE FOR CARRYING OUT THE INVENTION

Figure 2A:
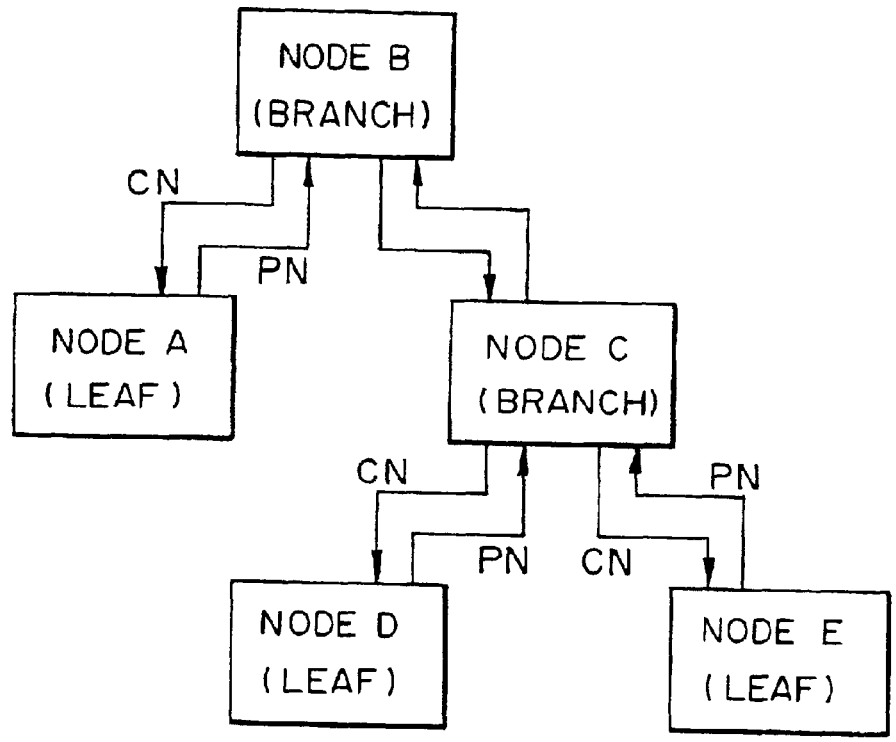
FIGS. 2A and 2B are illustrative of the concept of tree identification.

Preferred embodiments of the present invention are described below with reference to the accompanying drawings.

1. IEEE 1394

The description first relates to an outline of IEEE 1394.

1.1 Data Transfer Speed and Connection Topology

The IEEE 1394 standard (IEEE 1394-1995, P1394.a) enables high-speed data transfer at 100 to 400 Mbps (P1394.b concerns 800 to 3,200 Mbps). It also permits the connection of nodes of different transfer speeds to the same bus.

The nodes are connected in a tree configuration in which a maximum of 63 nodes can be connected to one bus. Note that the use of bus bridges enables the connection of approximately 64,000 nodes.

When power is applied or devices have been disconnected or connected while power is on, a bus reset occurs and all information relating to connection topology is cleared thereby. After the bus reset, tree identification (determination of the root node) and self identification are performed. Subsequently, the nodes that are to act as management nodes, such as the isochronous resource manager, cycle master, and bus manager, are determined. Ordinary packet transfer then starts.

1.2 Transfer Methods

IEEE 1394 provides for asynchronous transfer (suitable for data transfers where reliability is required) and isochronous transfer (suitable for transfers of data such as moving images and audio, where real-time capabilities are required), as packet transfer methods.

An example of an asynchronous subaction is shown in FIG. 1A. One subaction consists of arbitration, packet transfer, and acknowledgment. In other words, data transfer has precedence but first of all arbitration relating to the right of use of the bus takes place. A packet is then transferred from the source node (the originator of the transfer) to the destination node (the destination of the transfer). A source ID and a destination ID are comprised within the header of this packet. The destination node reads this destination ID and determines whether or not the packet is addressed to itself. When the destination node accepts the packet, it sends an acknowledgment (ACK) packet back to the source node.

There is an acknowledgment gap between the packet transfer and the ACK packet. There is also a subaction gap between one subaction and the next subaction. Arbitration for the next subaction cannot occur until a fixed bus idle time that is equivalent to this subaction gap has elapsed. This prevents collisions between subactions.

An example of an isochronous subaction is shown in FIG. 1B. Since an isochronous transfer is performed as a broadcast (transfer to all nodes connected to the bus), no ACK is sent back when a packet is received. With isochronous transfer, packet transfer is performed by using channel numbers, not node IDs. Note that there is an isochronous gap between subactions.

The state of the bus during data transfer is shown in FIG. 1C. Isochronous transfer starts whenever the cycle master generates a cycle start packet at fixed intervals. This enables the transfer of at least one packet every 125 μs, for one channel. This makes it possible to transfer data that requires real-time capabilities, such as moving images or audio.

Asynchronous transfer occurs in intervals between isochronous transfers. In other words, isochronous transfer has a higher priority than asynchronous transfer. This is implemented by making the length of an isochronous gap shorter than the length of a subaction gap during asynchronous transfer, as shown in FIG. 1C.

1.3 Tree Identification

Tree identification is performed after a bus reset. During this tree identification, the parent-child relationships between nodes and the root node are determined.

First of all, each leaf node (a node that is connected to only one other node) sends a "parent-notify" (PN) to the adjacent node. When nodes A, B, C, D, and E are connected as shown in FIG. 2A, by way of example, parent-notify is sent from node A to node B and from nodes D and E to node C.

A node that has accepted a parent-notify recognizes that the originating node is its own child. It then sends a "child-notify" (CN) to that node. In the example shown in FIG. 2A, a child-notify is sent from node B to node A and from node C to nodes D and E. This determines the parent-child relationships between nodes B and A, nodes C and D, and nodes C and E.

Figure 2B:
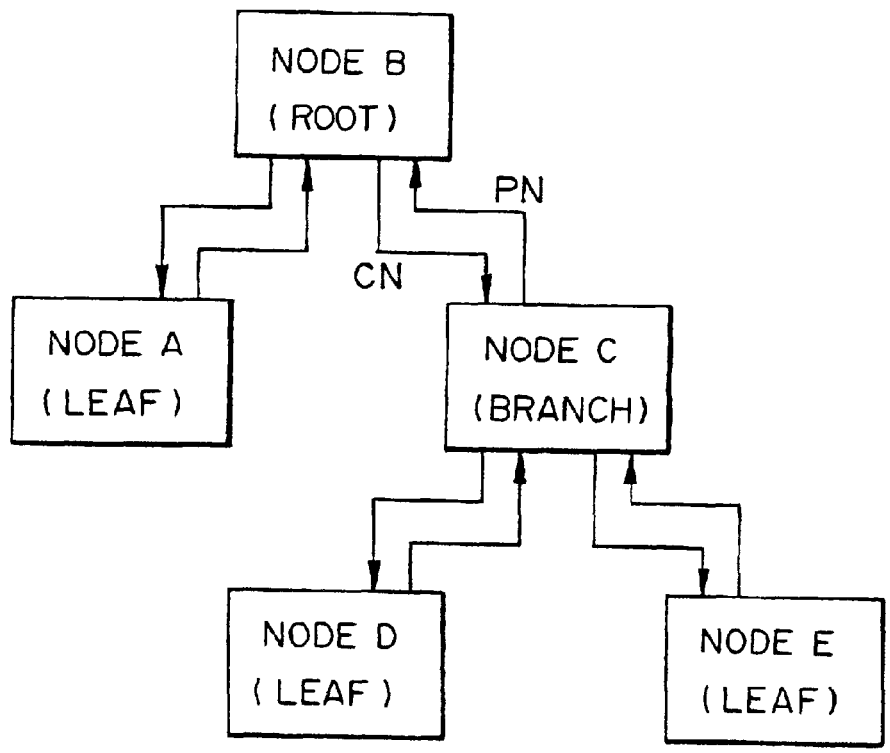

The parent-child relationship between nodes B and C is determined by which of them sends a parent-notify first. When, for example, node C sends the parent-notify first, node B becomes the parent and node C the child, as shown in FIG. 2B.

A node wherein all nodes connected to the ports thereof are own-children becomes the root. In FIG. 2B node B has become the root. Note that IEEE 1394 allows for the possibility of any node becoming the root.

1.4 Self Identification

After tree identification, self identification is performed. During self identification, self-ID packets are transferred in sequence starting from the nodes furthermost from the root node within the connection topology.

Figure 3:
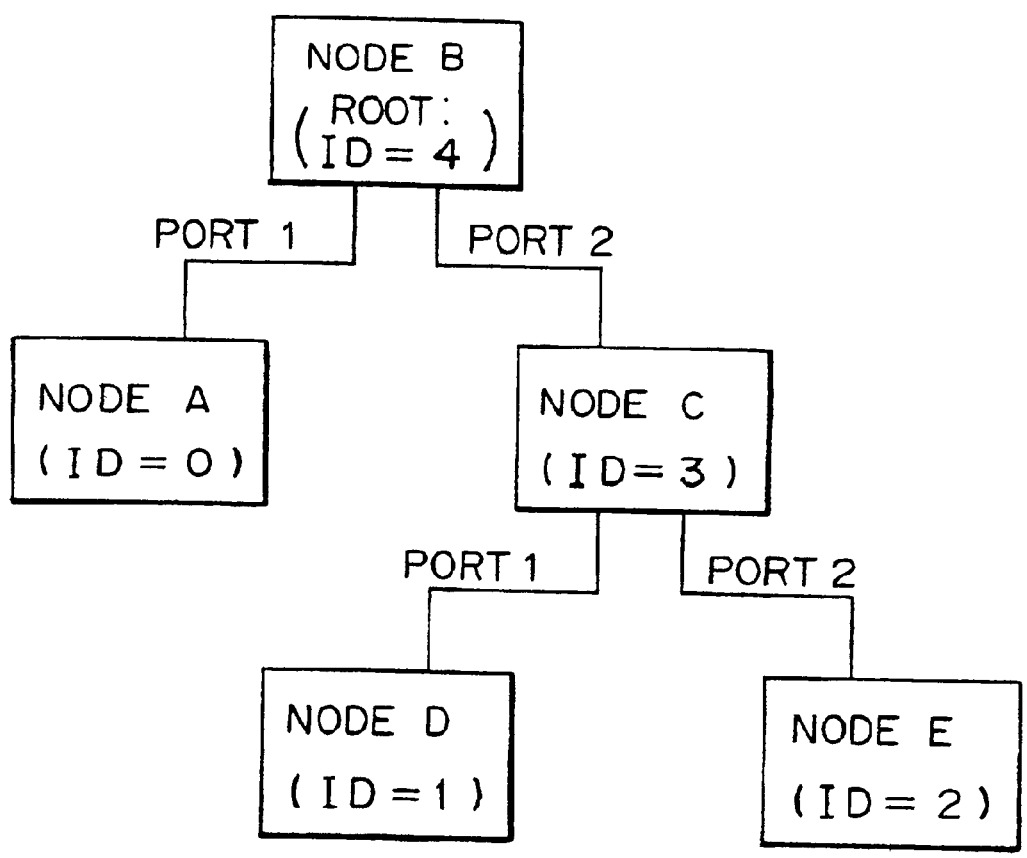
FIG. 3 is illustrative of the concept of self identification.

More specifically, node A, which is connected to port 1 (the port with the smaller number) of the root node B in the configuration shown by way of example in FIG. 3, first broadcasts a self-ID packet (self-identification packet) to all the nodes.

Node C, which is connected to port 2 (the port with the larger number) of the root node B, is then selected and node D, which is connected to port 1 (the port with the smaller number) of node C, broadcasts a self-ID packet. Node E, which is connected to port 2 (the port with the larger number) of node C, then broadcasts a self-ID packet, followed by node C. Finally, node B, which is the root, broadcasts a self-ID packet and self identification is complete.

The ID of each node is comprised within that node's self-ID packet. The ID of that node is the total number of self-ID packets that have been received from other nodes up to the point at which that node broadcasts its own self-ID packet. Taking the example shown in FIG. 3, no node has yet broadcast a self-ID packet at the point at which node A broadcasts, so the ID of node A becomes 0. Node A broadcasts a self-ID packet containing the ID of 0. When node D broadcasts, only node A has issued a self-ID packet. Therefore, the ID of node D becomes 1. In a similar manner, the IDS of nodes E, C, and B become 2, 3, and 4, respectively.

The format of a self-ID packet is shown in FIG. 4A. As shown in this figure, basic information on the nodes is comprised within the self-ID packets. More specifically, information such as the ID of each node ($PHY_{13}$ ID), whether or not the link layer is active (L), the gap-count ($gap_{13}$ cnt), the transfer speed (sp), whether or not the node has the capability of becoming an isochronous resource manager (C), the power state (pwr), and the port states (p0, p1, p2) is comprised therein.

Note that FIG. 4B shows the format of self-ID packets #1, #2, and #3 that are used when a node has 4 or more ports. When a node has between 4 and 11 ports, self-ID packets #0 (FIG. 4A) and #1 are used; when a node has between 12 and 19 ports, self-ID packets #0, #1, and #2 are used; and when a node has between 20 and 27 ports, self-ID packets #0, #1, #2, and #3 are used.

The formats of a link-on packet and a PHY configuration packet, which are physical-layer packets (PHY packets) in a similar manner to the self-ID packets, are shown in FIGS. 4C and 4D.

1.5 Isochronous Resource Manager

The isochronous resource manager (IRM) has the management functions described below.

First of all, it provides the various resources necessary for isochronous transfer. For example, it provides a channel number register and a bandwidth register. Secondly, it provides a register that indicates the ID of the bus manager. Thirdly, it takes on some of the bus management functions when there is no other bus manager.

Of the nodes which have the capability of becoming the IRM (which are capable of managing isochronous resources) and which are also in an operational state (having an active link layer), i.e., of the nodes qualified to become the IRM, the node closest to the root (the node with the largest ID) becomes the IRM. More specifically, of the nodes having self-ID packets (see FIG. 4A) wherein the C (CONTENDER) bit indicating whether or not that node has IRM capability and the L ($LINK_{13}$ ACTIVE) bit indicating whether or not the link layer is active are both 1, the closest node to the root (the node with the largest $PHY_{13}$ ID) becomes the IRM. when the C bit and L bit of the self-ID packet of the root node are both 1, for example, the root node will become the IRM.

1.6 Cycle Master and Bus Manager

The cycle master has the role of issuing the cycle start packet shown in FIG. 1C, and the root node becomes the cycle master.

The bus manager performs tasks such as creating a topology map (the connection states of all the nodes), creating a speed map, managing power to the bus, determining the cycle master, and optimizing the gap count.

1.7 Protocol Configuration

Figure 5:
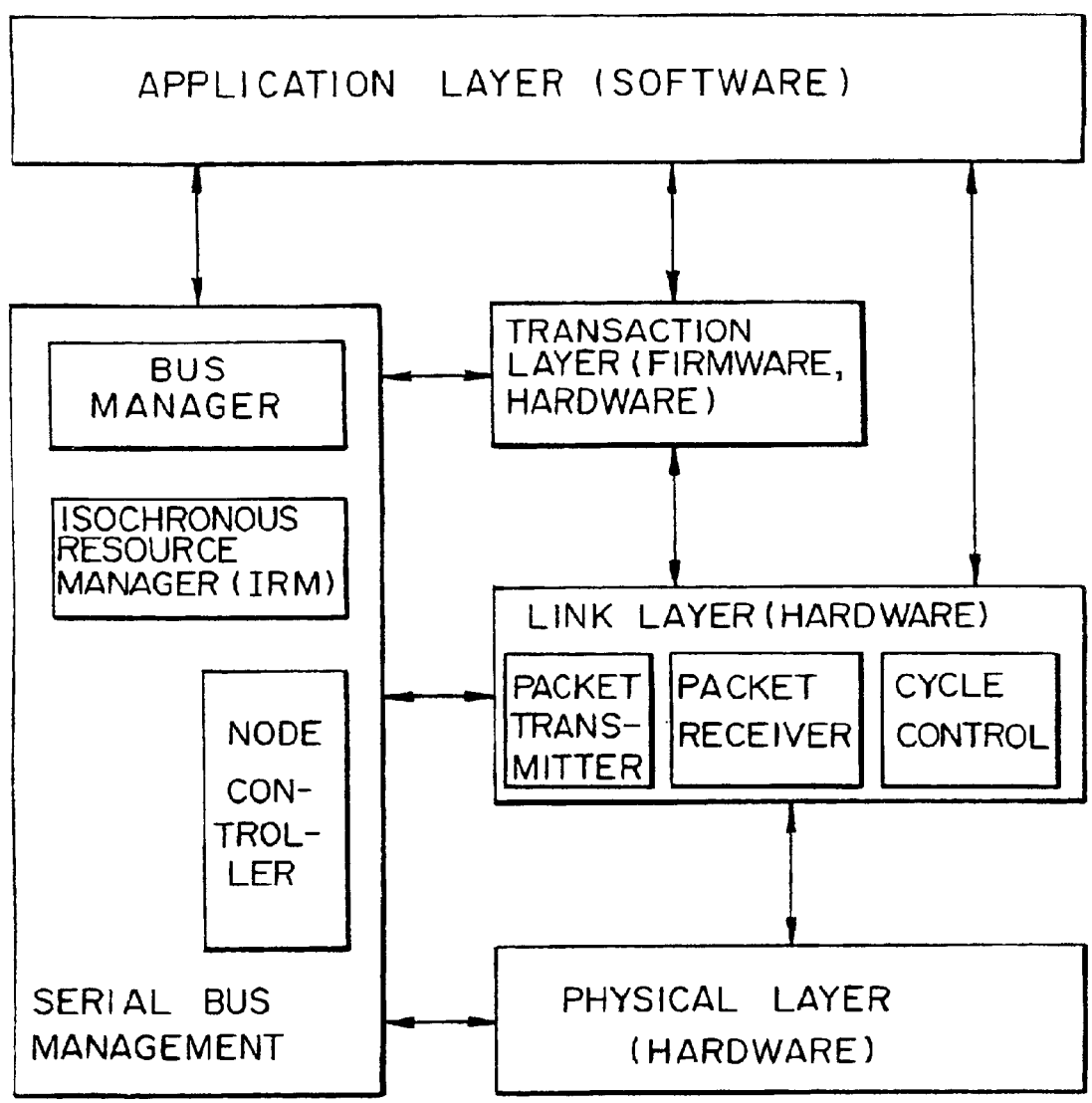
FIG. 5 is illustrative of the IEEE 1394 protocol configuration.

The description now turns to the protocol configuration (layer structure) of IEEE 1394, with reference to FIG. 5.

The IEEE 1394 protocol comprises a physical layer, a link layer, and a transaction layer. The serial bus management function monitors and controls the physical layer, link layer, and transaction layer, and provides various functions for controlling nodes and managing bus resources.

The physical layer converts the logical symbols used by the link layer into electrical signals, performs bus arbitration, and defines the physical bus interface.

The link layer provides functions such as addressing, data check, data framing, and cycle control.

The transaction layer defines the protocol for transactions such as read, write, and lock The physical layer and link layer are usually implemented by hardware such as a data transfer control device (interface chip). The transaction layer is implemented either by firmware operating on the CPU, or hardware.

2. Overall Configuration

The overall configuration of this embodiment is described below, with reference to FIG. 6.

Figure 6:
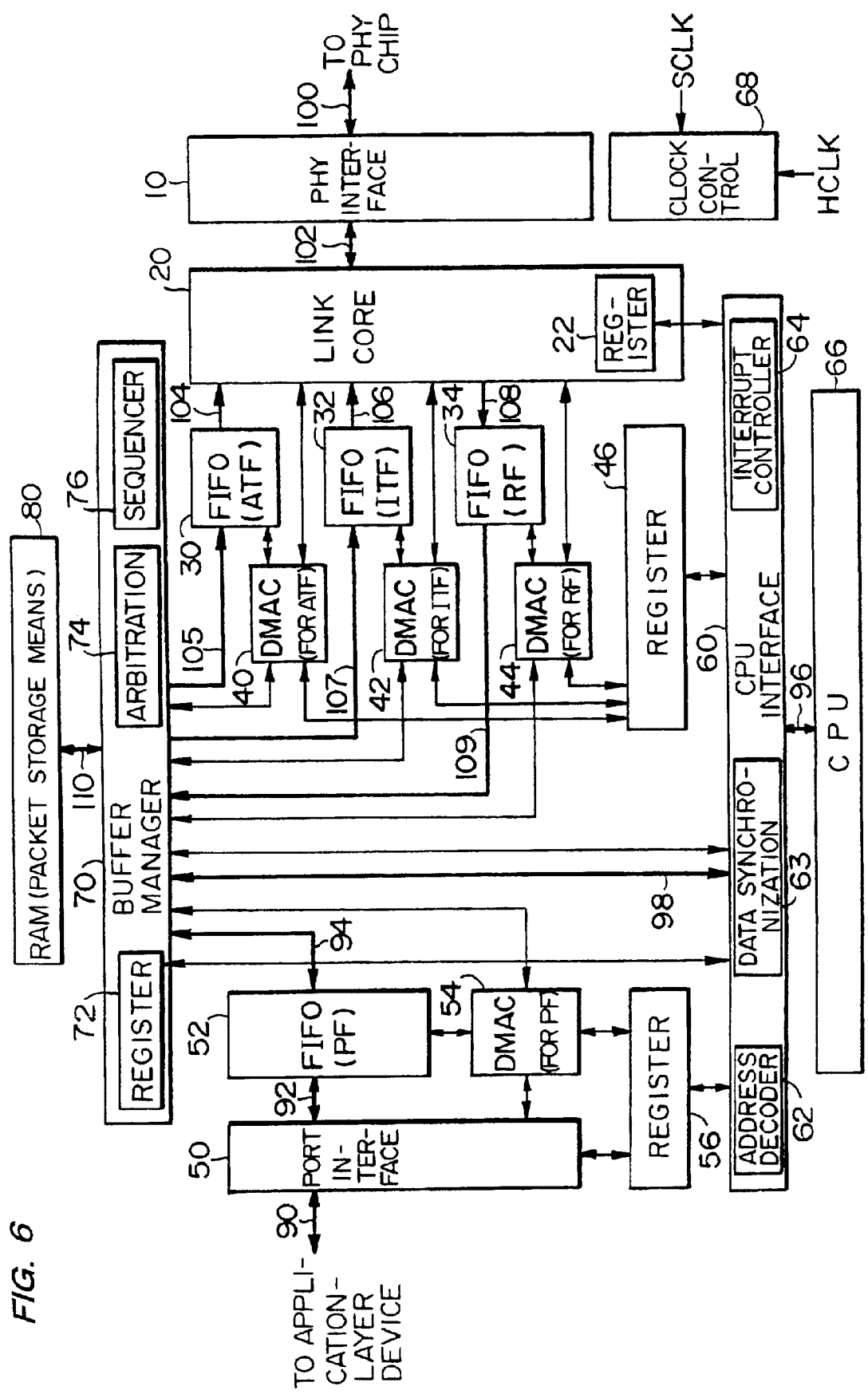
FIG. 6 shows a structural example of the data transfer control device of an embodiment of the present invention.

In FIG. 6, a PHY interface 10 is a circuit that provides an interface with a PHY chip that implements the physical-layer protocol.

A link core 20 (link means) is a circuit that implements part of the link layer protocol and the transaction layer protocol; it provides various service relating to packet transfer between nodes. A register 22 is provided to control the link core 20 that implements these protocols.

A FIFO (ATF) 30, FIFO (ITF) 32, and FIFO (RF) 34 are FIFOs for asynchronous transmission, isochronous transmission, and reception, respectively; each being configured of hardware means such as registers or semiconductor memory. In this embodiment of the invention, these FIFOs 30, 32, and 34 have an extremely small number of stages. For example, the number of stages per FIFO is preferably no more than three, and more preferably no more than two.

DMACs 40, 42, and 44 are DMA controllers for ATF, ITF, and RF, respectively. Use of these DMACs 40, 42, and 44 makes it possible to transfer data between a RAM 80 and the link core 20 without going through a CPU 66. Note that a register 46 provides control such as that over the DMACs 40, 42, and 44.

A port interface 50 is a circuit that provides an interface with application-layer devices (such as printer drivers, by way of example). In this embodiment of the invention, the use of this port interface 50 makes it possible to transfer 8-bit data, for example.

A FIFO (PF) 52 is a FIFO used for transferring data between an application-layer device and a DMAC 54 is a DMA controller for PF. A register 56 provides control over the port interface 50 and the DMAC 54.

A CPU interface 60 provides an interface with the CPU 66 that controls the data transfer control device. The CPU interface 60 comprises an address decoder 62, a data synchronizer 63, and an interrupt controller 64. A clock controller 68 controls the clock signals used by this embodiment, and an SCLK signal sent from the PHY chip and an HCLK signal that is a master clock are input thereto.

A buffer manager 70 is a circuit that manages the interface with the RAM 80. The buffer manager 70 comprises a register 72 for controlling the buffer manager, an arbitrator 74 that arbitrates the bus connection to the RAM 80, and a sequencer 76 that generates various control signals.

Figure 7:
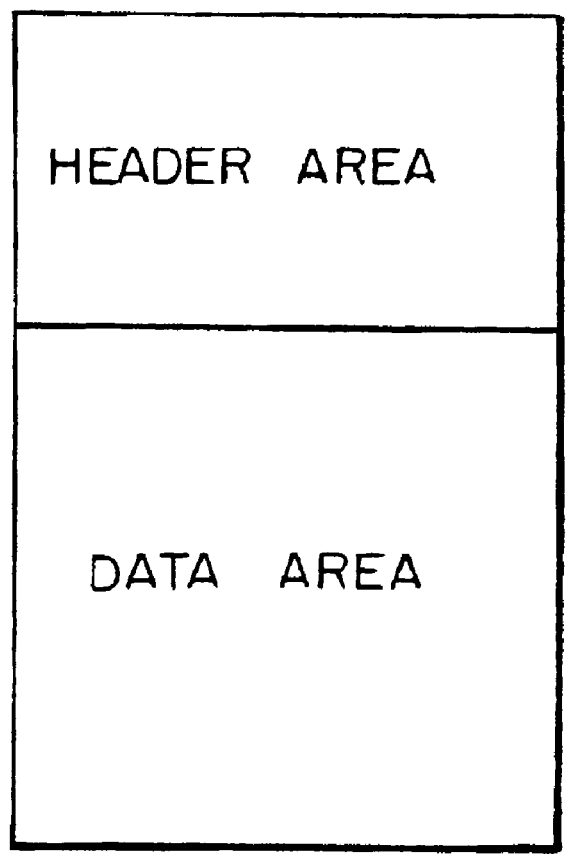
FIG. 7 is illustrative of the separation between the header (control information) area and the data area.

The RAM 80 functions as a randomly accessible packet storage means, where this function is implemented by SRAM or DRAM or the like. In this embodiment of the invention, the RAM 80 is divided into a header area (broadly speaking, a control information area) and a data area, as shown in FIG. 7. The header of a packet (broadly speaking, control information) is stored in the header area of FIG. 7, and the data of the packet is stored in the data area thereof.

It is especially preferable that the RAM 80 is accommodated within the data transfer control device of this embodiment. However, it is possible to attach a part or entire portion of the RAM 80 externally.

A bus 90 (or buses 92 and 94) is for connections to applications, as a first bus. Another bus 96 (or bus 98) is for controlling the data transfer control device, as a second bus, which is connected electrically to a device (such as a CPU) that controls the data transfer control device. Yet another bus 100 (or buses 102, 104, 105, 106, 107, 108, and 109) is for electrical connections to physical-layer devices (such as the PHY chip), as a third bus. A further bus 110 (a fourth bus) is for electrical connections to RAM that acts as a randomly accessible storage means.

The arbitrator 74 in the buffer manager 70 arbitrates bus access requests from the DMAC 40, the DMAC 42, the DMAC 44, the CPU interface 60, and the DMAC 54. Based on the results of this arbitration, a data path is established between one of the buses 105, 107, 109, 98, and 94 and the bus 110 of the RAM 80 (i.e., a data path is established between one of the first, second, and third buses and the fourth bus).

One feature of this embodiment is the way in which it is provided with the RAM 80, which stores packets in a randomly accessible manner, and also the mutually independent buses 90, 96, and 100 as well as the arbitrator 74 for connecting one of those buses to the bus 110 of the RAM 80.

Figure 8:
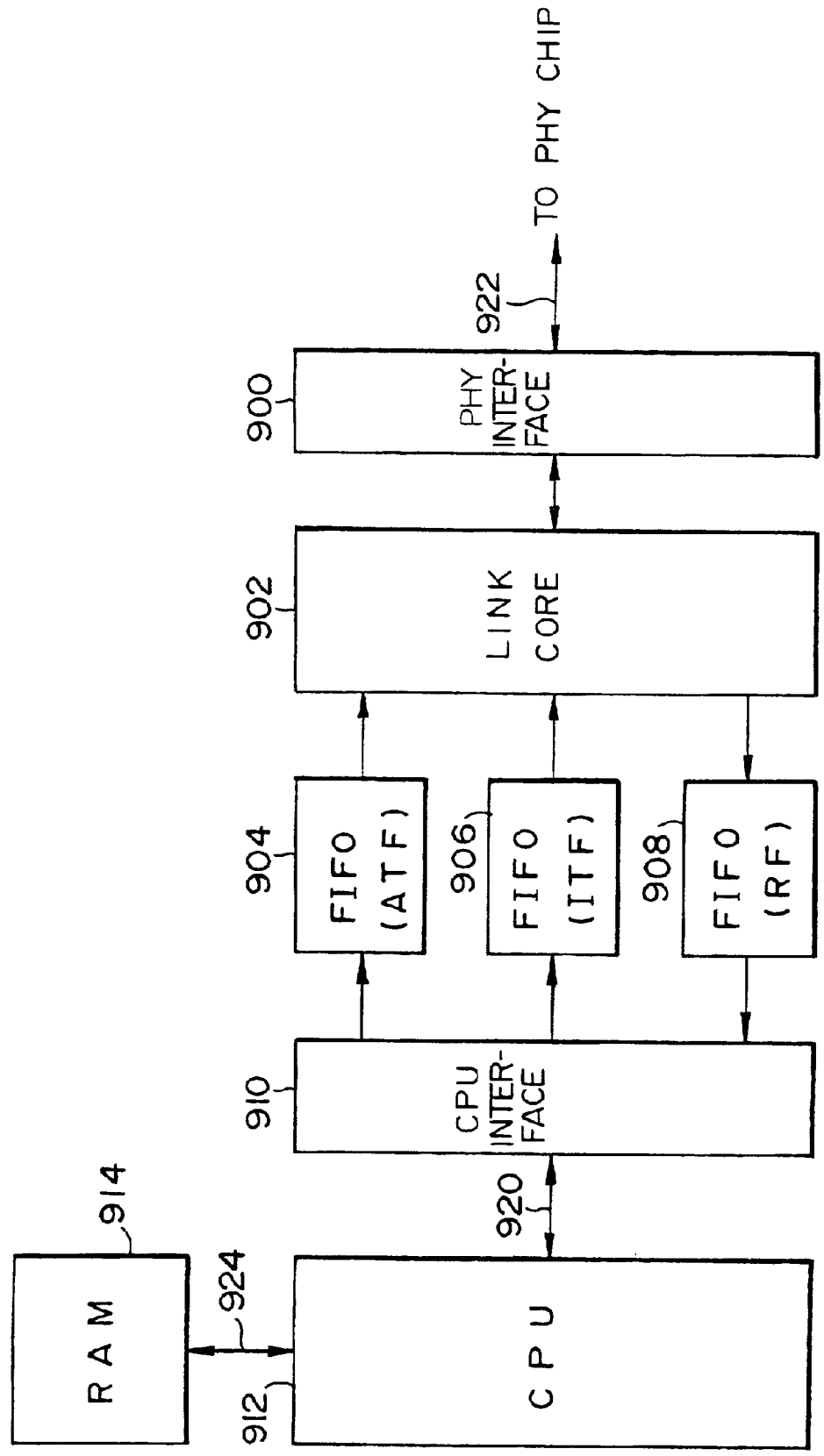
FIG. 8 shows the structure of a comparative example for this embodiment.

A data transfer control device that has a different configuration from that of this embodiment is shown in FIG. 8, by way of example. In this data transfer control device, a link core 902 is connected to a PHY chip by a PHY interface 900 and a bus 922. The link core 902 is connected to a CPU 912 by FIFOs 904, 906, and 908, a CPU interface 910, and a bus 920. The CPU 912 is also connected to a RAM 914, which is local memory in the CPU, by a bus 924.

Note that the FIFOS 904, 906, and 908 differ from the FIFOs 30, 32, and 34 of FIG. 6 in that they each have an extremely large number of stages (such as 16 stages per FIFO).

Figure 9:
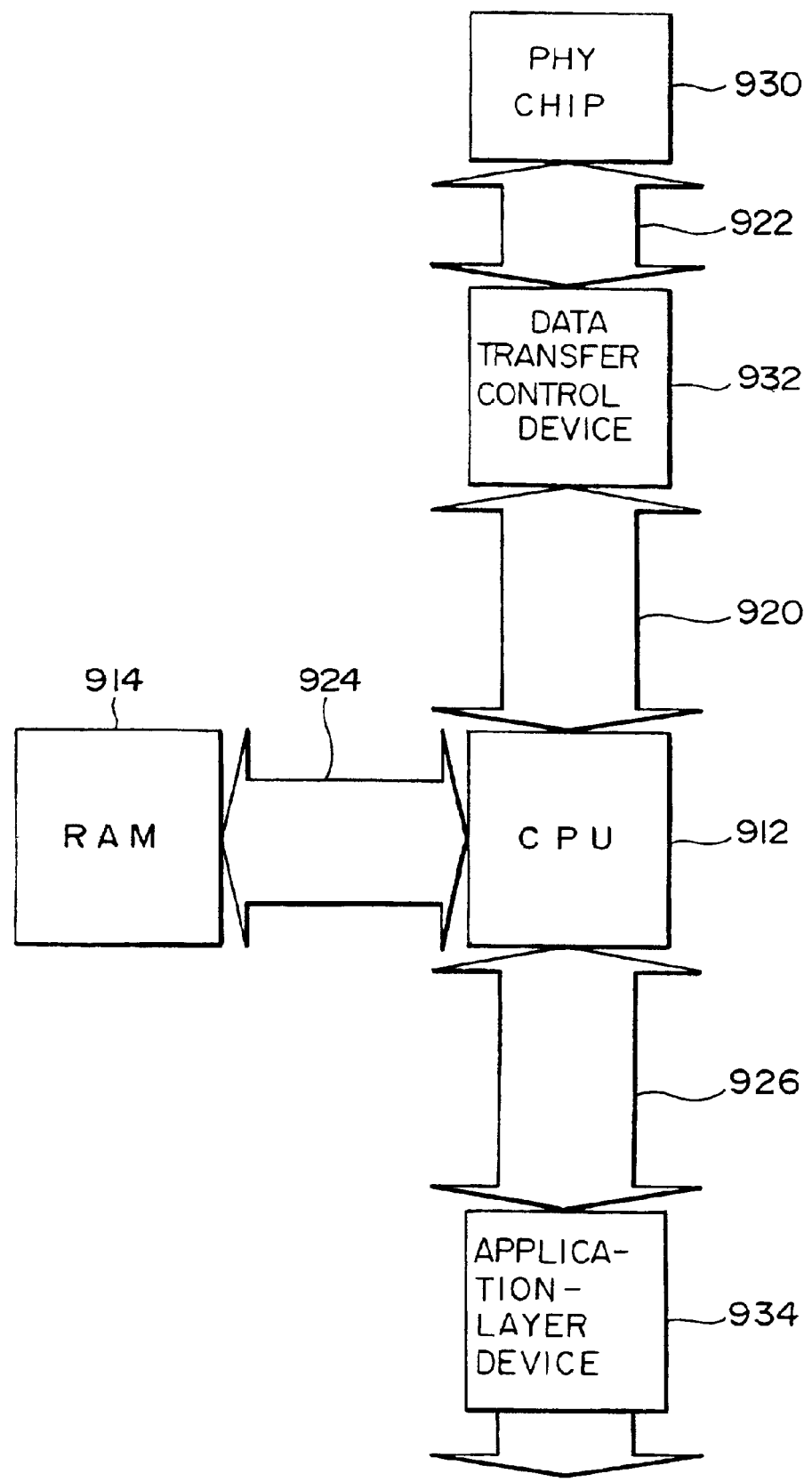
FIG. 9 is illustrative of the method of data transfer used by the configuration of FIG. 8.

The method of data transfer used with the data transfer control device configured as shown in FIG. 8 will now be described with reference to FIG. 9. A receive packet sent from another node through a PHY chip 930 passes through the bus 922, a data transfer control device 932, and the bus 920, then is accepted by the CPU 912. The CPU 912 writes the accepted receive packet to the RAM 914 over the bus 924. The CPU 912 processes the receive packet into a form that can be used by the application layer, then transfers it to an application-layer device 934 over a bus 926.

When the application-layer device 934 transfers data, on the other hand, the CPU 912 writes this data to the RAM 914. A header is appended to the data in the RAM 914 to create a packet that conforms to IEEE 1394. The thus created packet is sent to another node over the path comprising the data transfer control device 932 and the PHY chip 930.

Figure 10:
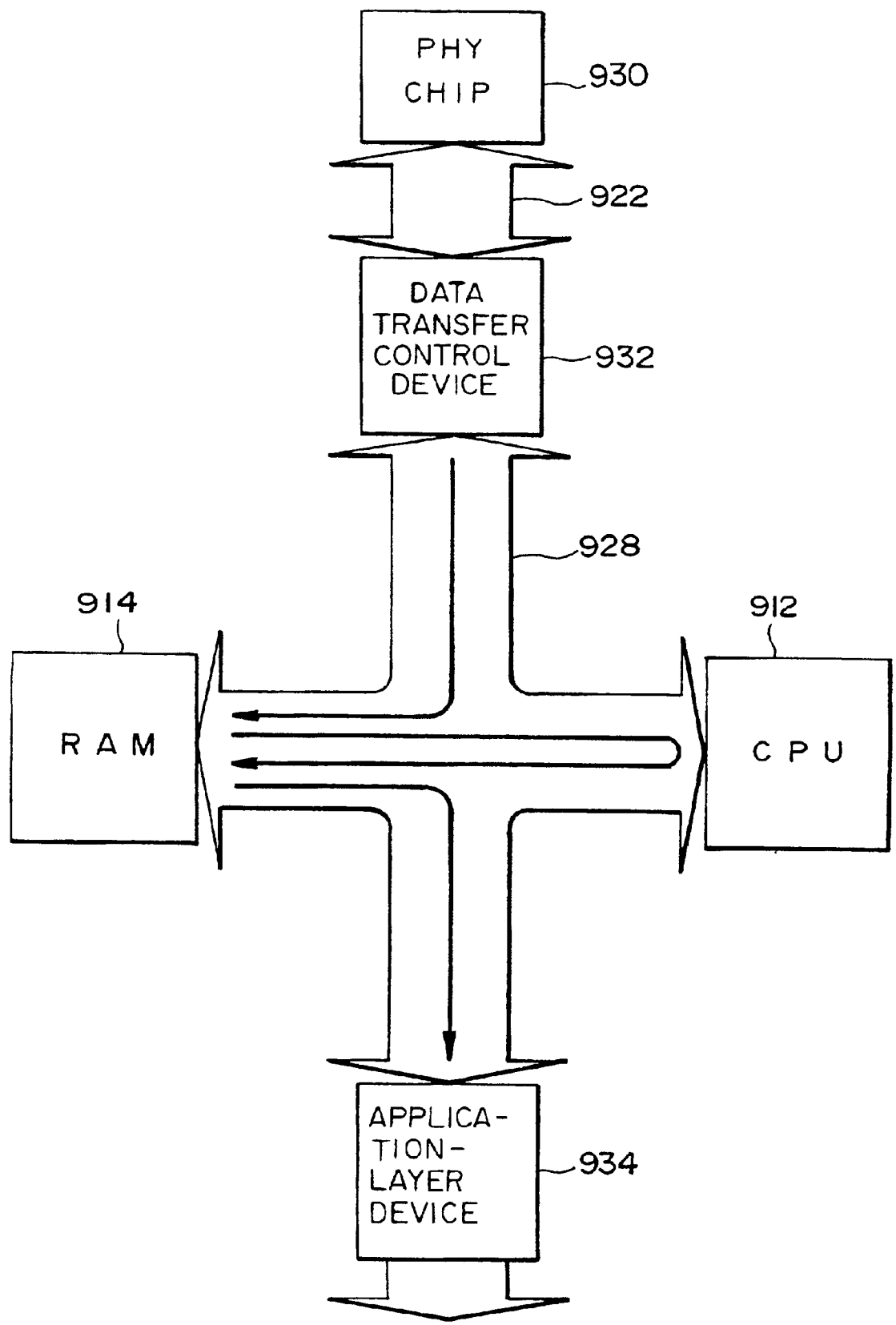
FIG. 10 is illustrative of another method of data transfer.

However, when this data transfer method is employed, the processing load on the CPU 912 is extremely heavy. This means that, even if there is a fast transfer speed over the serial bus that connects nodes, the actual transfer speed of the entire system is slowed by factors such as processing overheads of the CPU 912, so that it is ultimately not possible to implement high-speed data transfer.

one method that can be considered for solving this problem uses hardware DMA to implement data transfer between the data transfer control device 932 and the RAM 914 and data transfer between the RAM 914 and the application-layer device 934, as shown in FIG. 10.

With this method, however, a CPU bus 928 must be used for data transfers between the data transfer control device 932 and the RAM 914, between the RAM 914 and the CPU 912, and between the RAM 914 and the application-layer device 934. This means that when an attempt is made to increase the speed of data transfers within the entire system, a high-speed bus such as a PCI bus must be used as the CPU bus 928, leading to an increase in the cost of electronic equipment that uses this data transfer control device.

Figure 11:
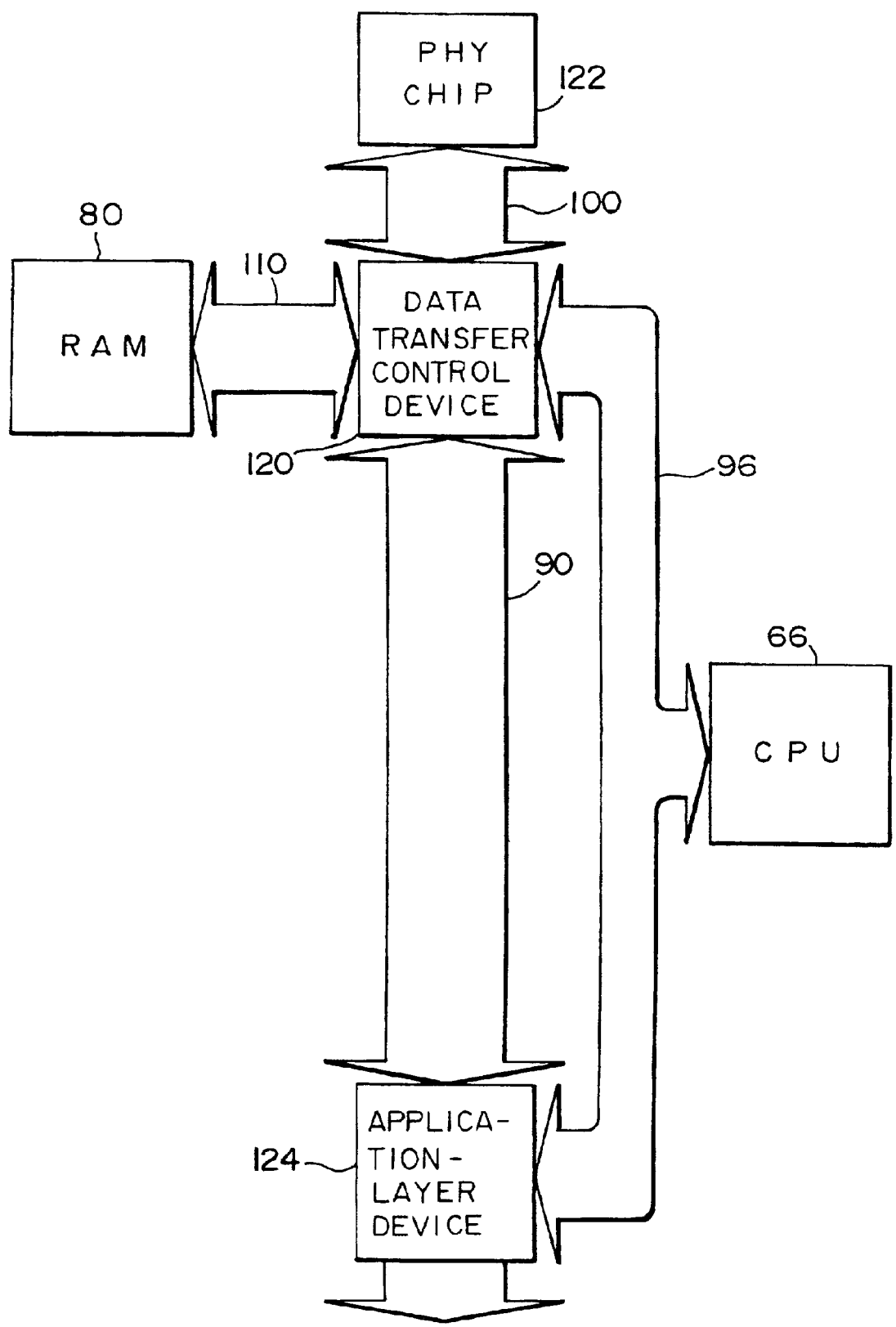
FIG. 11 is illustrative of the method of data transfer used by this embodiment of the invention.

In contrast thereto, this embodiment of the invention ensures that the bus 90 between a data transfer control device 120 and an application-layer device 124; the CPU bus 96; and the bus 110 between the data transfer control device 120 and the RAM 80 are mutually separated, as shown in FIG. 11. The configuration is therefore such that the CPU bus 96 can be used solely for controlling data transfer. In addition, the bus 90 is dedicated so that it can be used for data transfer between the data transfer control device 120 and the application-layer device 124. When, for example, the electronic equipment in which the data transfer control device 120 is incorporated is a printer, the bus 90 can be used exclusively for transferring print data. As a result, the processing load on the CPU 66 can be reduced and the actual transfer speed of the entire system can be increased. In addition, an inexpensive device can be employed as the CPU 66 and it is also no longer necessary to use a high-speed bus as the CPU bus 96. This ensures that the electronic equipment can be made less expensive and more compact.

3. Shaping(Reforming) of Self-ID Packet 3.1 Features of This Embodiment

Figure 12:
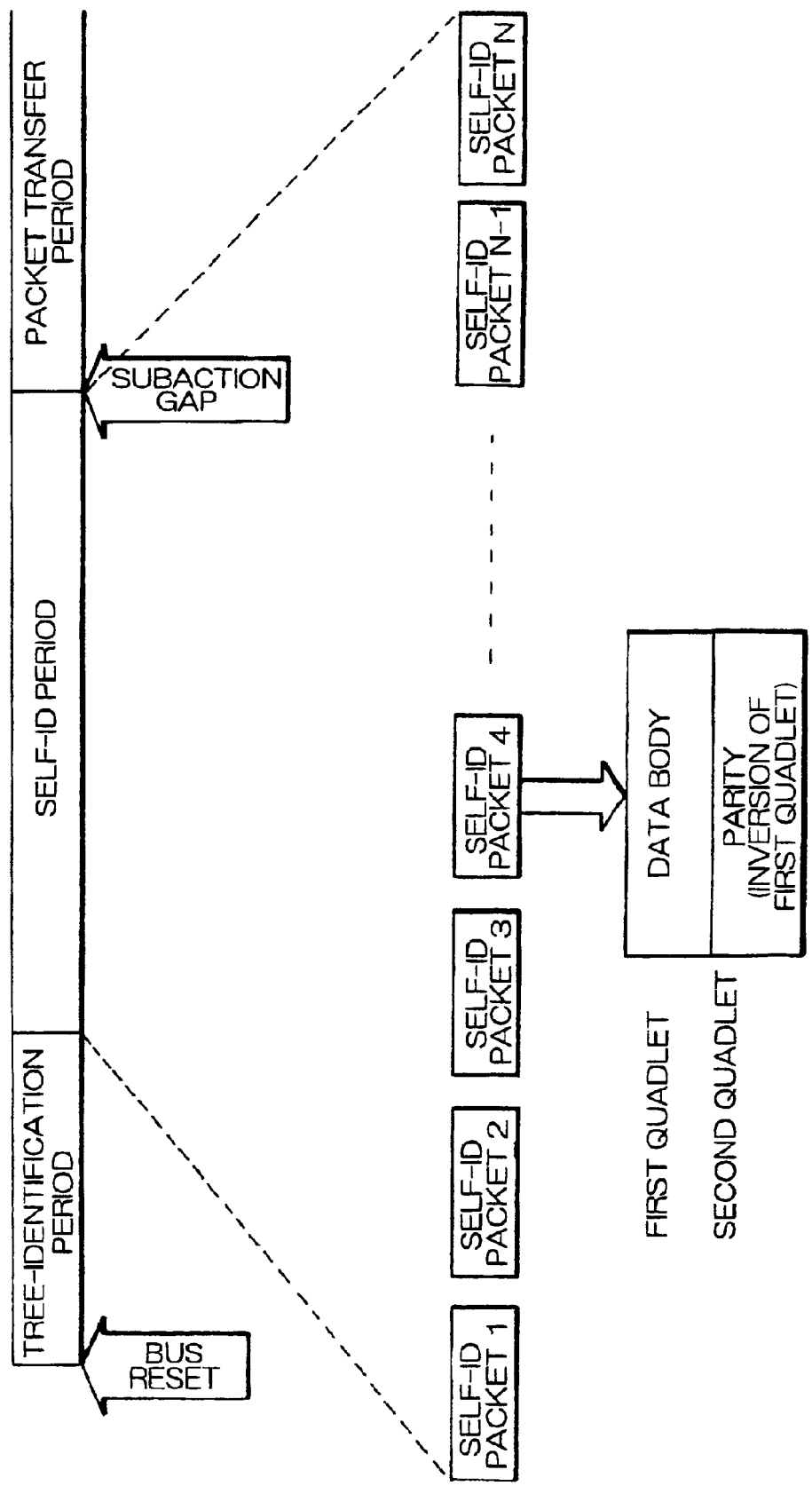
FIG. 12 is illustrative of the self-ID period.

During a self-ID period, self-ID packets are sent in from all the nodes connected to the bus, as shown in FIG. 12. The first quadlet of each self-ID packet forms the data itself (body), comprising basic information such as the node ID, and the second quadlet is parity information (error check information) that is the inverse of the first quadlet (for details, see FIG. 4A).

Figure 13A:
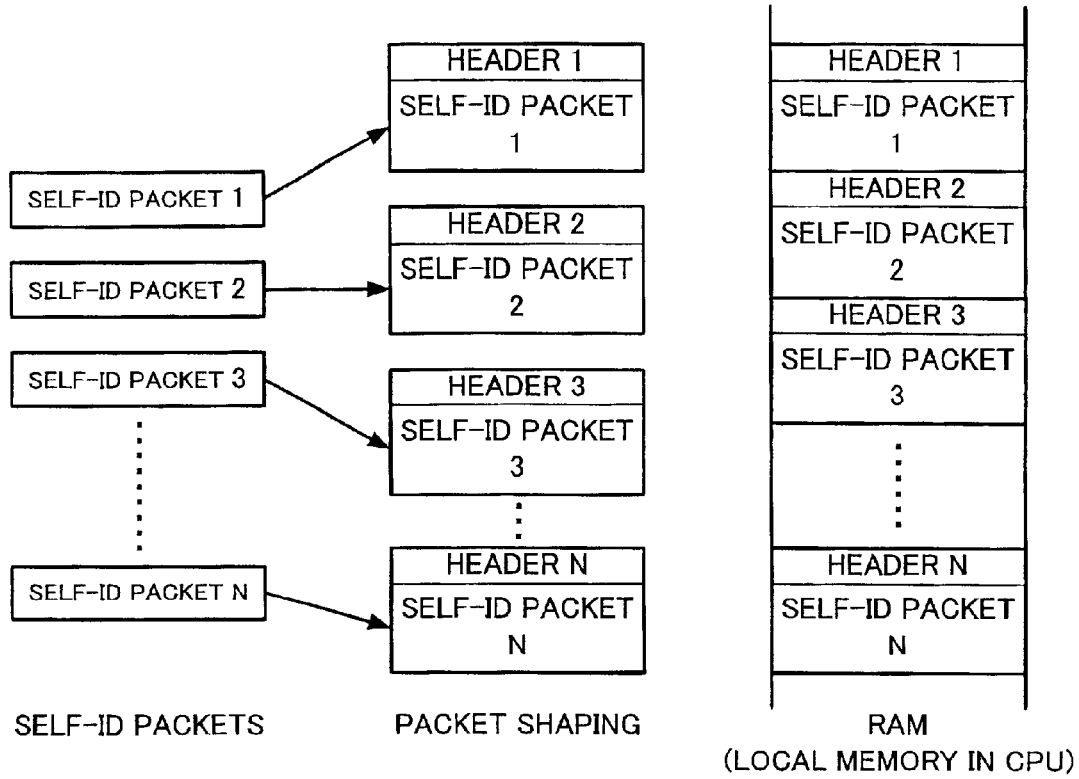
FIGS. 13A and 13B are illustrative of packet shaping in accordance with a comparative example and this embodiment of the invention, respectively.

With a data transfer control device of the configuration shown in FIG. 8, by way of example, a series of self-ID packets is shaped as shown in FIG. 13A. In other words, each self-ID packet, which is a physical-layer packet, is shaped by the attachment of a header that provides an interface with an upper layer (transaction layer or application layer). The thus-shaped packet is stored in RAM (the RAM 914 of FIG. 8), which is local memory for the CPU.

However, it is necessary to have the same number of self-ID packets as the number of nodes, so that when there are 63 nodes connected to the bus, a minimum of 63 self-ID packets must be retained, by way of example. In other words, there is usually an extremely number of self-ID packets. If a header is appended to each self-ID packet and the resultant packets are stored as is in RAM, therefore, the free RAM capacity will be reduced and it will not be possible to use the resources of each node efficiently. In addition, the firmware has to perform the necessary processing for the acceptance of every one of these self-ID packets. Therefore, if the number of self-ID packets increases, the processing load on the firmware will also increase. Furthermore, the work of shaping these accepted self-ID packets must be done after the self-ID period has ended, in other words, after an bus reset has occurred then an initial subaction gap has occurred. Therefore, if the number of self-ID packets increases, the processing load involved with shaping those packets will also increase.

Figure 13B:
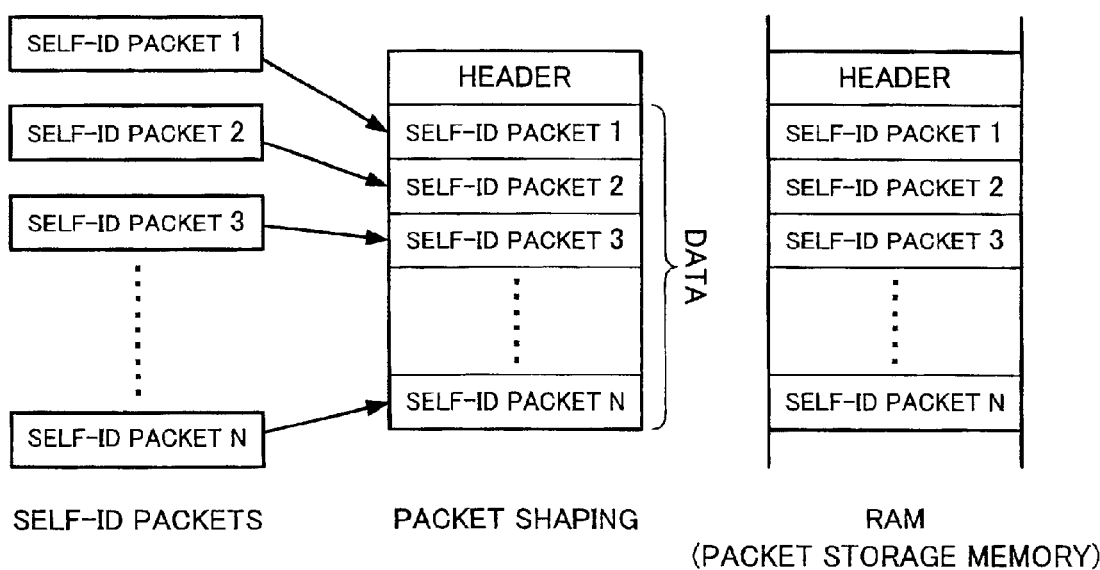

With this embodiment of the invention, a series of packets that are transferred in is shaped into a packet having a frame made up of a header (broadly speaking, control information) and data formed from that series of self-ID packets, as shown in FIG. 13B. In other words, the series of self-ID packets is re-packaged into a single packet and one header is appended to that re-packaged packet, to form an interface with upper layers.

In the comparative example of FIG. 13A, headers are appended in a one-to-one relationship to each self-ID packet. In contrast thereto, this embodiment of the invention concentrates on the wastage involved with appending headers to all of these self-ID packets, and thus appends a single header to a packet formed by re-packaging a series of self-ID packets.

This configuration succeeds in effectively eliminating the situation by which the free capacity of the RAM (the RAM 80 of FIG. 6), which is the packet storage means, is reduced. This makes it possible to reduce the size of the RAM, thus making it possible to make the data transfer control device and electronic equipment less expensive and more compact.

With the comparative example of FIG. 13A, if there are N self-ID packets, there will be N packets after they have been shaped. It is therefore necessary to perform N packet reads in order to read those shaped packets into RAM.

In contrast thereto, this embodiment of the invention uses only one shaped packet, even if there are N self-ID packets. It is therefore sufficient to perform only one packet read, in order to read that shaped packet into RAM. This means that the processing load on the firmware can be dramatically reduced. This makes it possible to utilize an inexpensive CPU, which makes the data transfer control device and electronic equipment less expensive and more compact.

Since this embodiment of the invention assembles a series of self-ID packets together as a single packet, it has the advantage of simplifying the packet handling in comparison with the comparative example of FIG. 13A.

Figure 14A:
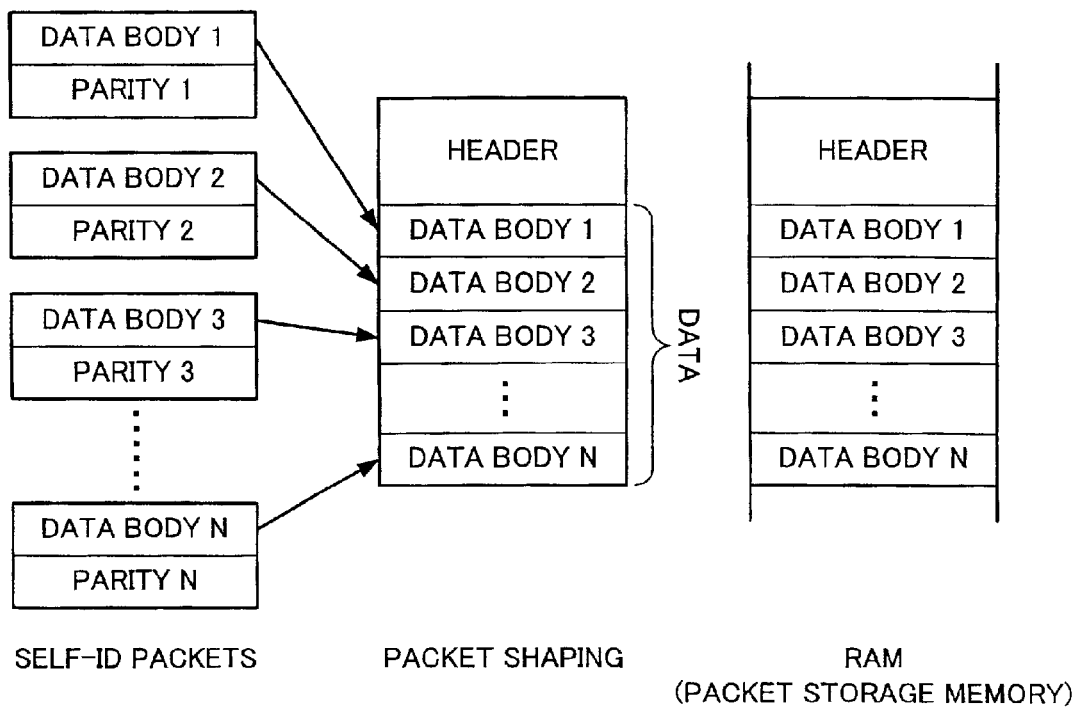
FIGS. 14A and 14B are illustrative of a method of erasing a parity portion of a self-ID packet.

This embodiment of the invention erases the parity information in the second quadlet of each self-ID packet and forms the data portion of the shaped packet by linking together the self-ID packets without the erased parities (the data of the self-ID packets), as shown in FIG. 14A. This makes it possible to reduce the size of the shaped packet to approximately half that of a packet formed by not erasing the parities. This succeeds in further reducing the capacity of RAM that is necessary for storing the self-ID packet.

Figure 14B:
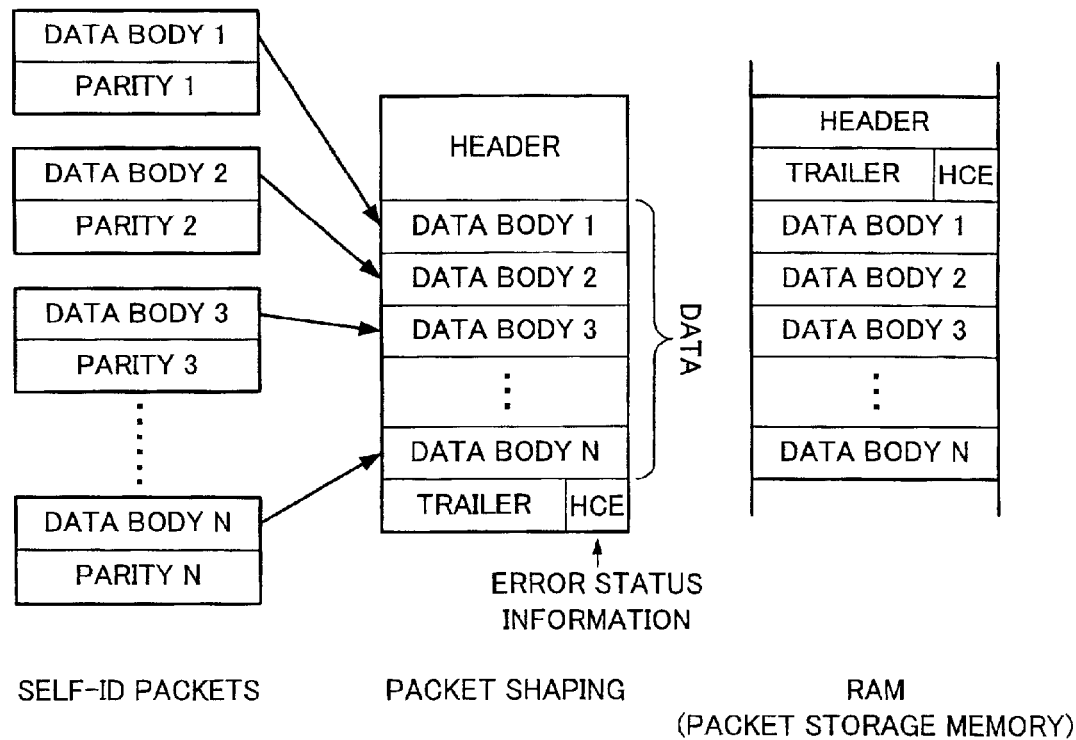

In such a case, it is preferable that the data transfer control device determines whether or not there is an error in each self-ID packet, based on parity information of that self-ID packet, and appends status information HCE indicating whether or not there is an error to the trailer (broadly speaking, control information) of the packet, as shown in FIG. 14B. This makes it possible to convey to the upper layers whether or not there is an error in the self-ID packets as appropriate, even if the parity information of individual self-ID packets has been erased.

Note that if there is an error in even one of the self-ID packets from the plurality of nodes connected to the bus, it will be necessary to re-do the self identification again, even if there are no errors in the other self-ID packets. It is therefore sufficient to use a single HCE bit as error status information for all of the self-ID packets.

In addition, although it is preferable to incorporate the HCE bit into the trailer (footer), as shown in FIG. 14B, HCE could equally well be incorporated into the header or it could be stored in a given storage means such as a register.

In this embodiment of the invention, the RAM is divided into a header area (broadly speaking, a control information area) and a data area, and the header and trailer of the re-packaged packet are stored in the header area and the data thereof is stored in the data area. A data pointer, which indicates the address (such as the start address) of data written into the data area, is appended to the header.

This simplifies the handling of the header and data, because the header and data are not mixed together in the RAM, thus making it possible to reduce the processing load on the CPU.

Note that data length information could be appended to the header or trailer in addition to the data pointer, for indicating the size of the data (the total size of data in self-ID packets 1 to N).

Figure 15A:
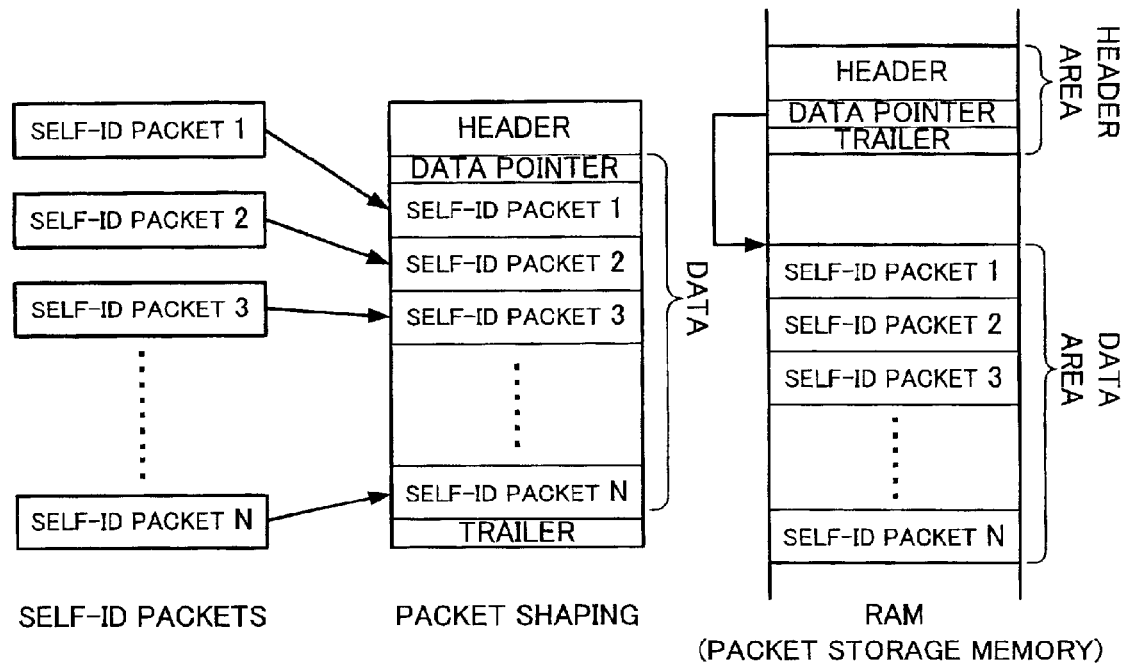
FIG. 15A is illustrative of a method of appending a data pointer to a header and FIG. 15B is illustrative of a method of appending BR, which indicates whether or not a packet was sent during the self-ID period, to a trailer.
Figure 15B:
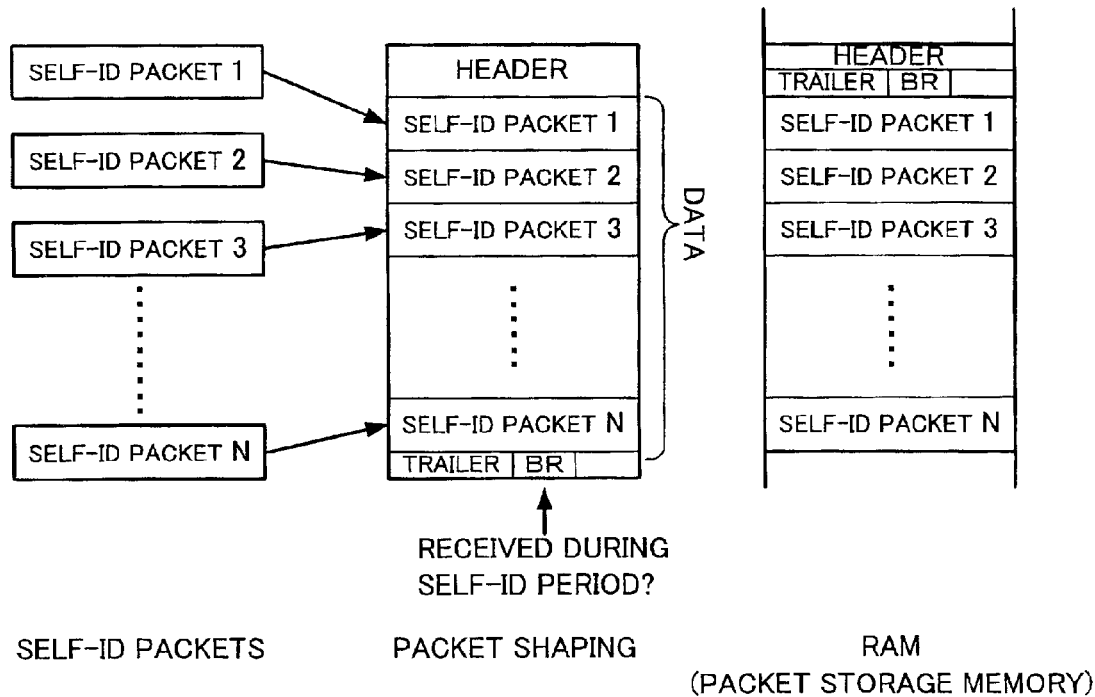

In addition, this embodiment of the invention appends BR, which is status information indicating whether or not the relevant packet was received during the self-ID period, to the trailer (broadly speaking, control information) of each packet, as shown in FIG. 15B.

In other words, PHY packets handled by the physical layer include link-on packets and PHY configuration packets, in addition to self-ID packets, as shown in FIGS. 4A to 4D. With this embodiment of the invention, it is preferable that the firmware can distinguish between self-ID packet and other PHY packets (link-on packets and PHY configuration packets) in a simple manner. That is why a data pointer is appended to the self-ID packet, as shown in FIG. 15A, so that the firmware can handle the self-ID packet in a different manner from other PHY packets.

However, it is not possible to distinguish what type of PHY packet is to be processed, even if tcode, which has been standardized by IEEE 1394 as information for distinguishing the packet type, is used.

With this embodiment of the invention, BR, which indicates whether or not the relevant packet was received during the self-ID period, is appended to the trailer of each packet, as shown in FIG. 15B. This makes it possible for the firmware or the like to distinguish whether a packet is a self-ID packet or another PHY packet in a simple manner, reducing the processing load.

Figure 16:
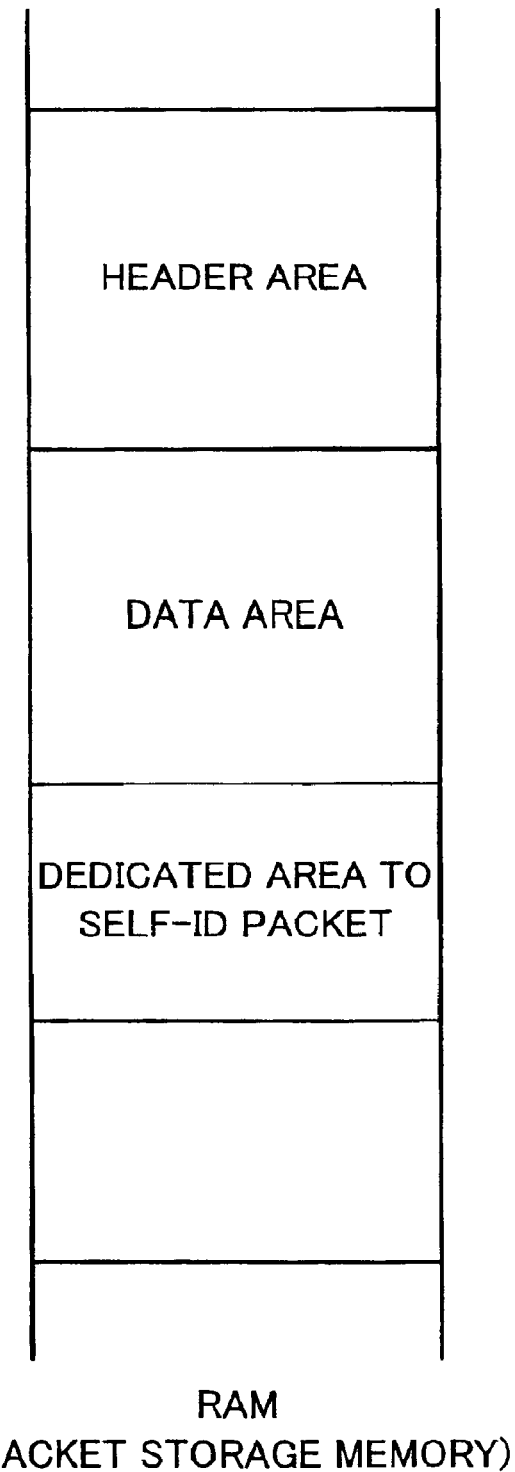
FIG. 16 is illustrative of a method of providing an area dedicated to self-ID packets, within the data area.

Note that this embodiment of the invention provides an area that is dedicated to self-ID packets within the data area, as shown in FIG. 16, and the data portion of the re-packaged packet can also be written to this area. This makes it possible to simplify the processing required for the creation of a topology map, thus enabling a reduction in the processing load on the firmware or the like.

3.2 Configuration

The packet-shaping(reforming) functions of this embodiment of the invention are implemented by the link core 20 of FIG. 6 and the packet-division functions are implemented by the DMAC 44.

Figure 17:
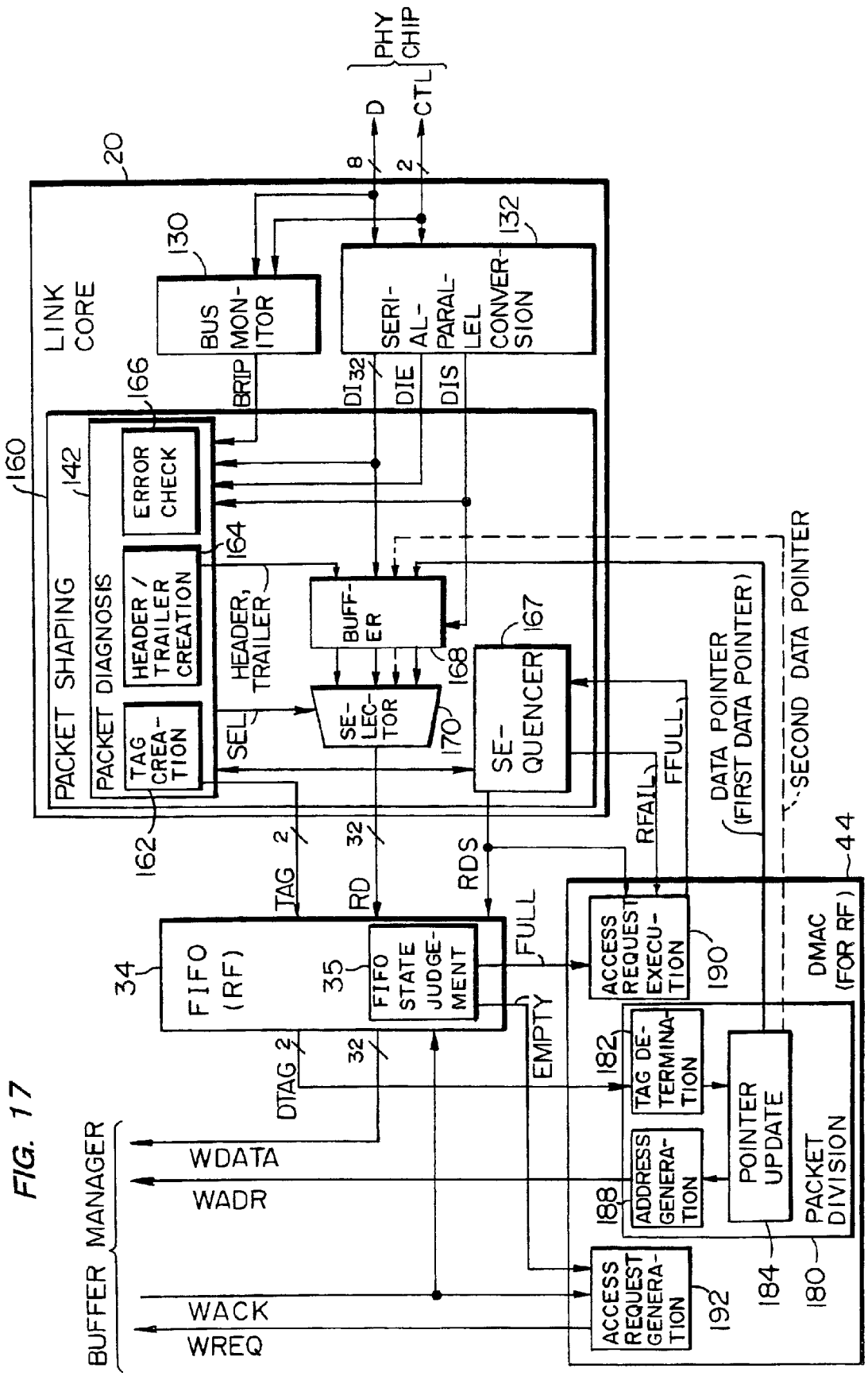
FIG. 17 shows a structural example of the link core (packet shaping circuit) and DMAC (for RF).

A detailed example of the configuration of the link core 20, the FIFO 34, and the DMAC 44 is shown in FIG. 17. Note that circuit blocks that are not related to packet shaping and packet division are omitted from FIG. 17.

The link core 20 comprises a bus monitor circuit 130, a serial-parallel conversion circuit 132, and a packet shaping circuit 160. The packet shaping circuit 160 comprises a packet diagnosis circuit 142, a sequencer 167, a buffer 168, and a selector 170; and the packet diagnosis circuit 142 comprises a tag creation circuit 162, a header/trailer creation circuit 164, and an error check circuit 166.

The bus monitor circuit 130 monitors the 8-bit data bus D and the 2-bit control bus CTL that are connected to the PHY chip by the PHY interface 10.

The serial-parallel conversion circuit 132 converts the data on the data bus D into 32-bit data. For example, when the transfer speed is 400 Mbps, 8-bit data is converted into 32-bit data; when the transfer speed is 200 Mbps, 4-bit data is converted into 32-bit data; and when the transfer speed is 100 Mbps, 2-bit data is converted into 32-bit data.

The packet diagnosis circuit 142 is a circuit that diagnoses packets such as self-ID packets. The tag creation circuit 162 creates tags for delimiting the header, data, trailer, etc., and the header/trailer creation circuit 164 creates headers and trailers (footers), as described with reference to FIGS. 13B to 15B. The error check circuit 166 investigates error check information, such as parity information, comprised within each packet, to detect any errors therein.

The sequencer 167 creates various control signals. The buffer 168 and the selector 170 select one of DI from the serial-parallel conversion circuit 132, a header and trailer from the packet diagnosis circuit 142, or data pointers from the DMAC 44, using a SEL signal from the packet diagnosis circuit 142.

The FIFO 34 functions as a buffer for adjusting the phase of RD (which is output data from the link core 20) and the phase of WDATA (which is data to be written to the RAM 80), and it comprises a FIFO state judgement circuit 35. The FIFO state judgement circuit 35 makes an EMPTY signal go active when the FIFO is empty and a FULL signal go active when the FIFO is full.

The DMAC 44 comprises a packet division circuit 180, an access request execution circuit 190, and an access request generation circuit 192.

The packet division circuit 180 is a circuit that divides packets that have been shaped by the packet shaping circuit 160, then writes the headers and trailers to the header area of the RAM 80 and the data to the data area thereof (see FIG. 7). The packet division circuit 180 comprises a tag determination circuit 182, a pointer update circuit 184, and an address generation circuit 188.

The tag determination circuit 182 identifies the tags (DTAG) created by the tag creation circuit 162.

The pointer update circuit 184 receives an output from the tag determination circuit 182 and updates the header pointer and data pointer, for writing the header and data to the RAM 80.

The address generation circuit 188 receives an output from the pointer update circuit 184 and issues a write address WADR to the RAM 80.

The access request execution circuit 190 executes access requests from the link core 20. When the FULL signal from the FIFO state judgement circuit 35 is active, the access request execution circuit 190 makes a FFULL signal go active. The sequencer 167 within the packet shaping circuit 160 makes RDS, which is a RD (RxData) strobe signal, go active on condition that FFULL is not active.

Note that RFAIL is a signal used by the sequencer 167 to inform the access request execution circuit 190 that a reception has failed.

The access request generation circuit 192 issues an access request to the RAM 80. The access request generation circuit 192 receives WACK (which is a write acknowledgment from the buffer manager 70) and EMPTY from the FIFO state judgement circuit 35, and outputs WREQ (which is a write request) to the buffer manager 70.

3.3 Operation

The operation of this embodiment of the invention will now be described with reference to the timing waveforms shown in FIG. 18.

The description first concerns the operation of the link core 20.

The bus monitor circuit 130 determines whether or not the operation is within a self-ID period (the period from a bus reset to the first subaction) and, when it is in this self-ID period, it makes a signal BRIP go high to indicate that the bus is being reset, as shown at C1 in FIG. 18.

Figures 19A, 19B, 19C:
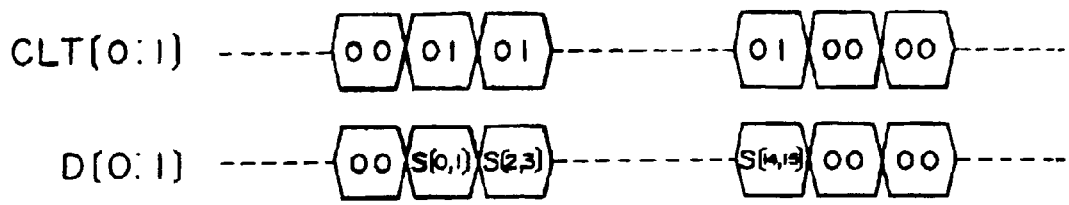
FIGS. 19A, 19B, and 19C are illustrative of the control bus CTL, data bus D, and status information (status bits).

Whether or not the operation is in the self-ID period is detected as described below. First of all, the bus monitor circuit 130 monitors the 2-bit CTL from the PHY chip. When CTL is 01, as shown in FIG. 19A, it is determined that status information is being sent from the PHY chip over the data bus D, as shown in FIG. 19B. Checking the status information coming in over the data bus D from the PHY chip makes it possible to determine whether or not the bus has been reset (from bit 2) and whether or not a subaction gap has occurred (from bit 1), as shown in FIG. 19C. When the bus monitor circuit 130 determines that a bus reset has occurred, it sets BRIP to high as shown in FIG. 18, and when it determines that a subaction gap has occurred, it returns BRIP to low.

By monitoring this BRIP, the packet diagnosis circuit 142 can perceive whether or not the operation is within the self-ID period. A packet that has been sent in during this self-ID period is regarded as a self-ID packet and the previously described packet shaping is performed thereon.

When the self-ID period starts, the header/trailer creation circuit 164 of the packet diagnosis circuit 142 creates a header. This header is input to the selector 170 through the buffer 168, and the selector 170 selects it, based on the signal SEL from the packet diagnosis circuit 142. This causes the header to be output to the FIFO 34 as RD, as shown at C2 in FIG. 18.

Figure 20A:
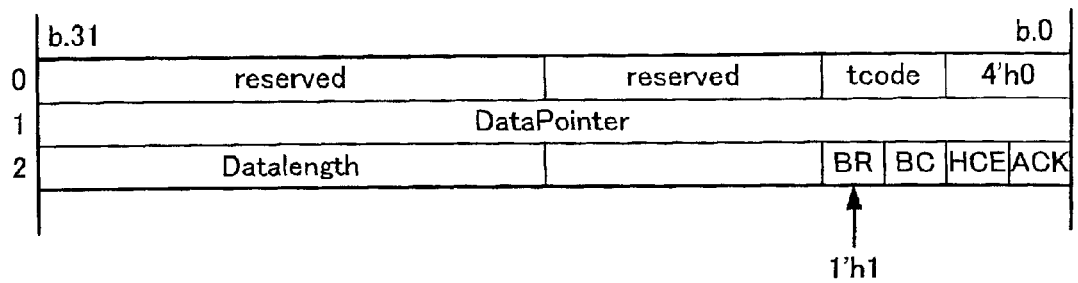
FIGS. 20A and 20B show PHY packet formats.

Note that the format of the header and trailer created by the header/trailer creation circuit 164 when a packet is a self-ID packet is shown in FIG. 20A. The hatched portion in this figure is the trailer; the rest is the header.

Figure 20B:
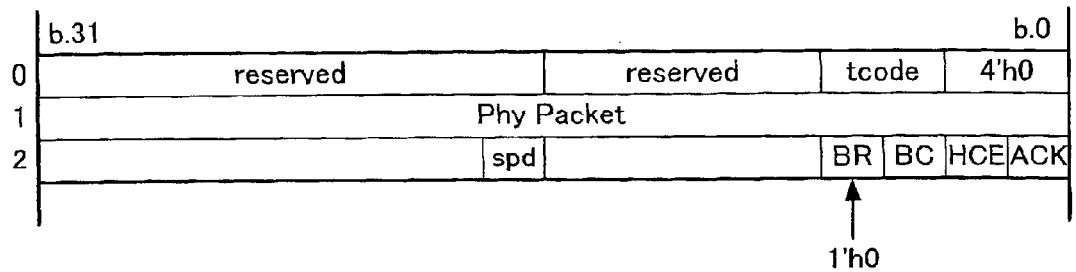

The format of the header and trailer created by the header/trailer creation circuit 164 when a packet is a PHY packet other than a self-ID packet is shown in FIG. 20B.

When the header is output as RD, a data pointer from the DMAC 44 is then input through the buffer 168 to the selector 170, and is selected by the selector 170. This causes the data pointer to be output to the FIFO 34 as RD, as shown at C3 in FIG. 18.

When CTL is 10, as shown in FIG. 19B, this is a reception state and self-ID packets are being sent in over the data bus D from the PHY chip. The serial-parallel conversion circuit 132 converts the data of such a self-ID packet as 32-bit data DI, and outputs it to the packet diagnosis circuit 142 and the buffer 168.

Note that DIE is a signal that indicates whether the DI data is enabled or disabled (enabled when DIE is high). The packet diagnosis circuit 142 can perceive delimiters of the packet by checking this DIE. DIS is a strobe signal that indicates the DI fetch timing.

When the data pointer is output as RD, the above described DI (a series of self-ID packets) is then input from the serial-parallel conversion circuit 132 to the selector 170 through the buffer 168, and is selected by the selector 170. This causes the series of self-ID packets to be output as RD to the FIFO 34, as shown at C4.

Note that the second quadlet of each self-ID packet is erased during this process in accordance with this embodiment of the invention, and is thus not output to the FIFO 34, as was described with reference to FIG. 14A. The error check circuit 166 of the packet diagnosis circuit 142 checks these second quadlets. When there is one packet with an error among the series of self-ID packets, the error check circuit 166 instructs the header/trailer creation circuit 164 to append the error status information HCE to the trailer, as was described with reference to FIG. 14B.

When DI is output as RD, the trailer from the header/trailer creation circuit 164 is then input to the selector 170 through the buffer 168, and is selected by the selector 170. This causes the trailer to be output to the FIFO 34 as RD, as shown at C5.

This trailer comprises Datalength indicating the size of the data, BR indicating whether or not packets were received during the self-ID period, and error status information HCE, as shown in FIG. 20A.

Note that when a packet to be processed is a self-ID packet received during the self-ID period, BR becomes 1 as shown in FIG. 20A; when it is a link-on packet or PHY configuration packet received outside of the self-ID period, BR becomes 0 as shown in FIG. 20B. This enables the firmware to distinguish between these packets, even when tcode is the same 0×E.

If there is an error in even one of the self-ID packets, HCE becomes 1. This makes it possible for the firmware or the like to detect whether or not there is an error in the self-ID packets, in a simple manner, enabling re-processing of the self identifications again.

The tag creation circuit 162 generates tags for distinguishing between the various types of information that are output as RD. In this embodiment of the invention, each tag has two bits, as shown in FIG. 21, where (00), (01), (10), and (11) indicate header, trailer, data, and start (top of the header), respectively. Therefore, the tags shown in FIG. 18 by way of example change, in the sequence: (11), (00), (10), (10), . . . , (01). The configuration is such that 34-bit data consisting of these 2-bit tags and the 32-bit RD are input to the FIFO 34.

A timing waveform chart of the processing during the shaping of a PHY packet (link-on packet or PHY configuration packet) that is not a self-ID packet, outside of the self-ID period, is shown in FIG. 22. The packet diagnosis circuit 142 determines that this is not the self-ID period when BRIP is low. In this case, the signal SEL is controlled and the data pointer is not selected after the header has been created. In other words, this processing differs from that shown at C3 in FIG. 18 in that no processing is done to append a data pointer to the header, as shown at D1 in FIG. 22. And as shown at D2 in FIG. 22, processing to re-package plurality of PHY packets into a single packet is not performed. The BR bit that indicates whether or not this is the self-ID period is set to 0, as shown in FIG. 20B. The tags change in this sequence: (11), (10), (01).

The description now turns to the operation of the DMAC 44.

The tag determination circuit 182 comprised within the packet division circuit 180 determines each DTAG that is output from the FIFO 34 together with WDATA (which is data written to the RAM 80), to identify whether WDATA refers to the start (top of the header), header, data, or trailer. The pointer update circuit 184 updates the header pointer and the data pointer based on this result. The address generation circuit 188 then generates WADR (the write address for WDATA) based on the updated header pointer and data pointer.

More specifically, when it is determined from the DTAG that WDATA is the start or the header, for example, the pointer update circuit 184 increments (broadly speaking, updates) the header pointer. The address generation circuit 188 issues WADR (which is an address in the RAM 80) in accordance with the thus incremented header pointer.

When it has been determined from the DTAG that WDATA is data, the pointer update circuit 184 increments the data pointer. The address generation circuit 188 issues WADR in accordance with the data pointer that is to be incremented. Finally, when it has been determined from the DTAG that WDATA is a trailer, the pointer update circuit 184 increments the header pointer this time.

The above described configuration makes it possible to divide the packet and write the contents to separate header and data areas.

A particular feature of this embodiment is the way in which the data pointer to be appended to the header is transferred from the pointer update circuit 184 to the packet shaping circuit 160. The packet shaping circuit 160 appends the thus transferred data pointer to the header.

This configuration makes it possible for the firmware or the like, which reads a header from the header area, to easily determine the storage address within the data area of the data that corresponds to that header. In addition, the data pointer is appended by the packet shaping circuit 160, so it is not necessary for the DMAC 44 (the packet division circuit 180) to participate therein. The DMAC 44 can therefore concentrate on writing data to the RAM 80, which simplifies the circuit configuration and processing of the DMAC.

Note that the settings of boundaries that divide up the area of the RAM 80, such as the boundary between the header area and the data area (P1 to P6 in FIG. 16) is implemented by the CPU 66 (firmware, or the like) setting pointers that indicate the addresses of the boundaries, and sending them through the CPU interface 60 into the pointer setting registers within the register 46.

When the data area is divided into a plurality of areas (when it is divided into areas for isochronous transfer and asynchronous transfer, or when it is divided into areas for first and second asynchronous transfers) it is preferable to have a plurality of data pointers indicating those areas. More specifically, assume that the DMAC 44 passes a plurality of data pointers, such as first and second data pointers, to the packet shaping circuit 160 (it is equally possible to pass three or more data pointers in this manner), as shown in FIG. 17. Such a configuration makes it possible to store moving image data from a digital camera continuously in the data area for isochronous transfer and print data for a printer continuously in the second data area for asynchronous transfer (storing control data such as command data and status data in the first data area for isochronous transfer).

The access request generation circuit 192 generates WREQ and outputs it to the buffer manager 70, based on EMPTY from the FIFO state judgement circuit 35 and WACK from the buffer manager 70. The arbitration circuit 74 of the buffer manager 70 arbitrates bus usage, based on this WREQ, the status of the DMAC 54 for PF, and WREQ from the CPU interface 60.

4. Electronic Equipment

The description now turns to examples of electronic equipment comprising the data transfer control device of this embodiment.

Figure 23A:
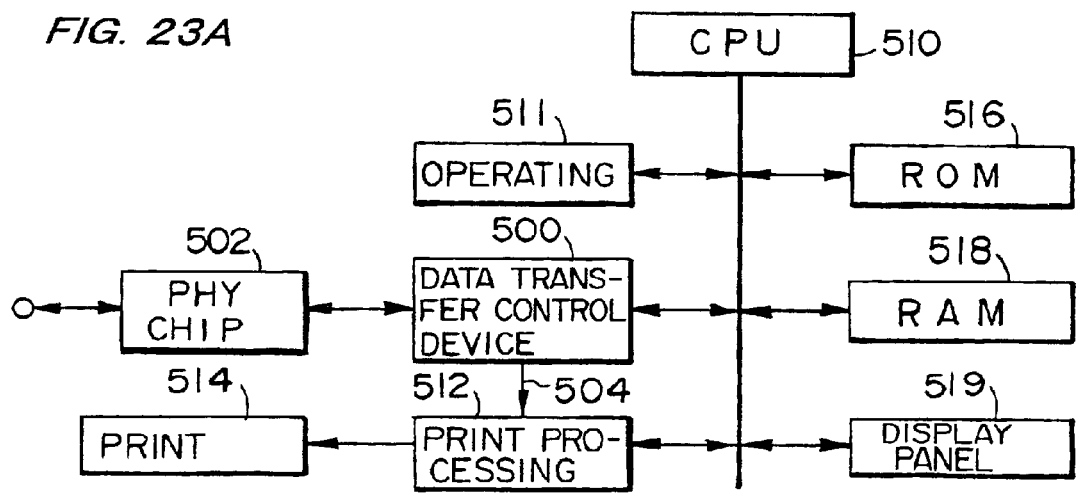
FIGS. 23A, 23B, and 23C show examples of the internal block diagrams of various items of electronic equipment.
Figure 24A:
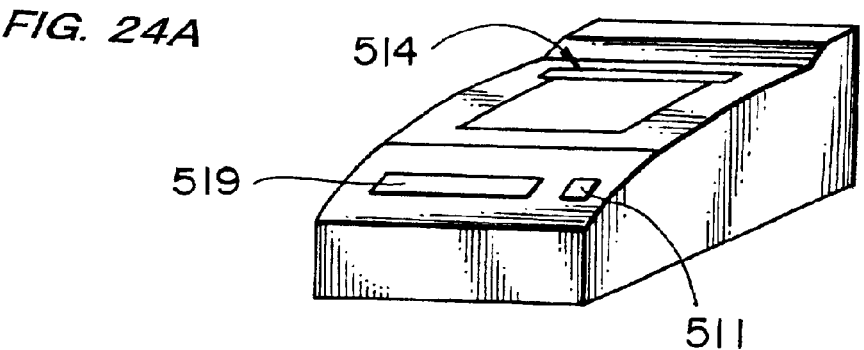
FIGS. 24A, 24B, and 24C show external views of various items of electronic equipment.

An internal block diagram of a printer that is one example of such electronic equipment is shown in FIG. 23A with an external view thereof being shown in FIG. 24A. A CPU (microcomputer) 510 has various functions, including that of controlling the entire system. An operating section 511 is designed to allow the user to operate the printer. Data such as a control program and fonts is stored in a ROM 516, and a RAM 518 functions as a work area for the CPU 510. A display panel 519 is designed to inform the user of the operational state of the printer.

Print data that is sent from another node, such as a personal computer, through a PHY chip 502 and a data transfer control device 500 is sent directly to a print processing section 512 over a bus 504. The print data is subjected to given processing by the print processing section 512 and is output for printing to paper by a print section (a device for outputting data) 514.

Figure 23B:
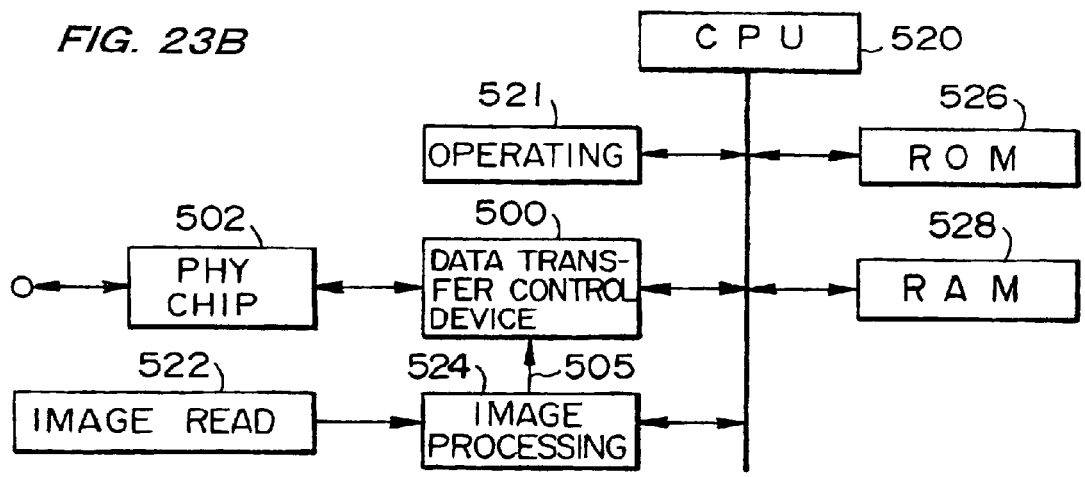
Figure 24B:
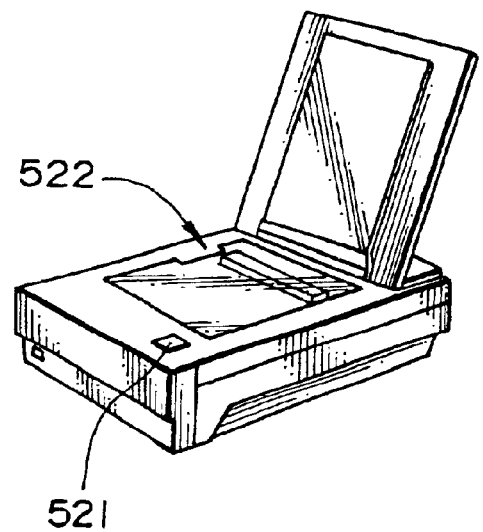

An internal block diagram of a scanner that is another example of electronic equipment is shown in FIG. 23B with an external view thereof being shown in FIG. 24B. A CPU 520 has various functions, including that of controlling the entire system. An operating section 521 is designed to allow the user to operate the scanner. Data such as a control program is stored in a ROM 526 and a RAM 528 functions as a work area for the CPU 520.

An image of a document is read in by an image read section (a device for fetching data) 522, which comprises components such as a light source and an opto-electric converter, and data of the read-in image is processed by an image processing section 524. The processed image data is sent directly to the data transfer control device 500 over a bus 505. The data transfer control device 500 creates packets by attaching headers and the like to this image data, then sends those packets through the PHY chip 502 to another node such as a personal computer.

Figure 23C:
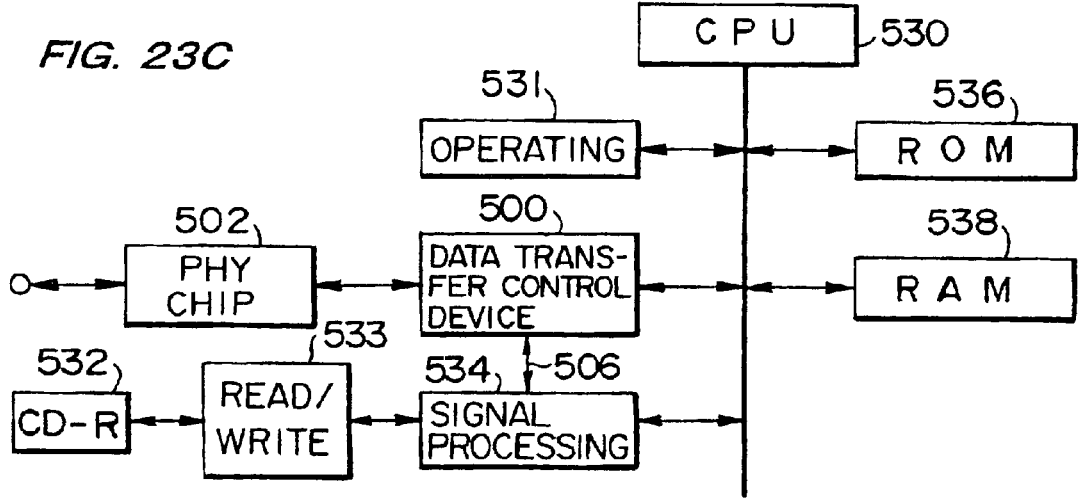
Figure 24C:
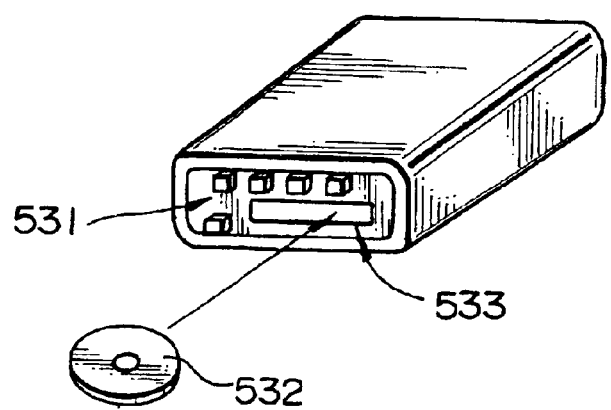

An internal block diagram of a CD-R drive that is a further example of electronic equipment is shown in FIG. 23C with an external view thereof being shown in FIG. 24C. A CPU 530 has various functions, including that of controlling the entire system. An operating section 531 is designed to allow the user to operate the CDDR. Data such as a control program is stored in a ROM 536 and a RAM 538 functions as a work area for the CPU 530.

Data read out from a CD-R 532 by a read/write section (a device for fetching data or a device for storing data) 533, which comprises components such as a laser, a motor, and an optical system, is input to a signal processing section 534 where it is subjected to given signal processing such as error correction. The data that has been subjected to this signal processing is sent directly to the data transfer control device 500 over a bus 506. The data transfer control device 500 creates packets by attaching headers and the like to this data, then sends those packets through the PHY chip 502 to another node such as a personal computer.

Data that has been sent in from another node through the PHY chip 502 and the data transfer control device 500, on the other hand, is sent directly to the signal processing section 534 over the bus 506. The data is subjected to given signal processing by the signal processing section 534 then is stored by a read/write section 533 in the CDDR 532.

Note that another CPU for data transfer control by the data transfer control device 500 could be provided in addition to the CPU 510, 520, or 530 of FIG. 23A, 23B, or 23C.

Use of the data transfer control device of this embodiment in electronic equipment makes it possible to perform high-speed data transfer. Therefore, if a user wishes to order a printout from a personal computer or the like, the printout can be completed with only a small time lag. Similarly, a user can see a scanned image with only a small time lag after instructing the scanner to take an image. It is also possible to read data from a CD-R or write data to a CD-R at high speeds. The present invention also makes it simple to use a plurality of items of electronic equipment connected to one host system or a plurality of items of electronic equipment connected to a plurality of host systems, for example.

Use of the data transfer control device of this embodiment in electronic equipment also reduces the processing load on firmware running on the CPU, making it possible to use an inexpensive CPU and low-speed buses. It is also possible to reduce the capacity of the RAM in which packets are stored. This makes it possible to ensure that electronic equipment is less expensive and more compact.

Note that the electronic equipment that can employ a data transfer control device in accordance with the present invention is not limited to the above described embodiments, and thus that various other examples can be considered, such as various types of optical disk drive (CD-ROM or DVD), magneto-optic disk drives (MO), hard disk drives, TVs, VTRs, video cameras, audio equipment, telephones, projectors, personal computers, electronic data book, and dedicated wordprocessors.

Note also that the present invention is not limited to the embodiments described herein, and various modifications are possible within the scope of the invention laid out herein.

For example, the configuration of the data transfer control device in accordance with the present invention is preferably that as shown in FIG. 6, but it is not limited thereto. It is also possible to employ the configuration shown in FIG. 8, by way of example.

Similarly, the present invention is preferably applied to data transfer as defined by the IEEE 1394 standard, but it is not limited thereto. For example, the present invention can also be applied to data transfer in accordance with standards that are based on a similar concept to that of IEEE 1394 or standards that are developed from IEEE 1394.

What is claimed is:

1. A data transfer control device for transferring data among a plurality of nodes that are connected to a bus, said data transfer control device comprising:
a packet shaping circuit which receives a series of self-identification packets that are transferred from said nodes, and shapes said transferred series of said self-identification packets into a packet having a frame made of control information that is used by an upper layer and data that is formed from an assembly of said transferred series of said self-identification packets; and
a write circuit which writes the shaped packet to a storage memory.

2. The data transfer control device as defined in claim 1, wherein said packet shaping circuit erases error check information within each of said self-identification packets when each of said self-identification packets comprises error check information, and shapes said transferred series of said self-identification packets into a packet having a frame made of data formed from an assembly of said self-identification packets each of which error check information has been erased, and said control information.

3. The data transfer control device as defined in claim 2, wherein data transfer is performed in accordance with IEEE 1394 standard.

4. The data transfer control device as defined in claim 2, further comprising:
a detecting circuit which detects whether or not the current period is a self-identification period, based on status information that has been sent from a lower layer;
wherein said packet shaping circuit regards a series of packets that have been transferred in during said self-identification period as self-identification packets, and shapes said series of said self-identification packets.

5. The data transfer control device as defined in claim 2, further comprising:

a packet division circuit which writes control information of the packet into a control information area of said storage memory and data of the packet into a data area of said storage memory, said storage memory being randomly accessible and being divided into the control information area and the data area; and
an appending circuit which appends a data pointer indicating an address of data to be written to said data area, to said control information.

6. The data transfer control device as defined in claim 5, wherein said packet division circuit writes data of the packet obtained by shaping said series of said self-identification packets into an area within said storage memory that is dedicated to self-identification packets.

7. The data transfer control device as defined in claim 2, wherein said packet shaping circuit appends status information to control information of the packet to indicate whether or not said self-identification packets were received during a self-identification period.

8. The data transfer control device as defined in claim 2, wherein said packet shaping circuit determines whether or not there is an error in said self-identification packets that are transferred from said nodes, based on said error check information, and appends status information to control information of the packet to indicate whether or not there is an error in said self-identification packets.

9. The data transfer control device as defined in claim 8, further comprising:
a detecting circuit which detects whether or not the current period is a self-identification period, based on status information that has been sent from a lower layer;
wherein said packet shaping circuit regards a series of packets that have been transferred in during said self-identification period as self-identification packets, and shapes said series of said self-identification packets.

10. The data transfer control device as defined in claim 8, wherein data transfer is performed in accordance with the IEEE 1394 standard.

11. The data transfer control device as defined in claim 8, wherein said packet shaping circuit appends status information to control information of the packet to indicate whether or not said self-identification packets were received during a self-identification period.

12. The data transfer control device as defined in claim 8, further comprising:
a packet division circuit which writes control information of the packet into a control information area of said storage memory and data of the packet into a data area of said storage memory, said storage memory being randomly accessible and being divided into the control information area and the data area; and
an appending circuit which appends a data pointer indicating an address of data to be written to said data area, to said control information.

13. The data transfer control device as defined in claim 12, wherein said packet division circuit writes data of the packet obtained by shaping said series of said self-identification packets into an area within said storage memory that is dedicated to self-identification packets.

14. The data transfer control device as defined in claim 1, wherein said packet shaping circuit appends status information to control information of the packet to indicate whether or not said self-identification packets were received during a self-identification period.

15. The data transfer control device as defined in claim 14, wherein data transfer is performed in accordance with the IEEE 1394 standard.

16. The data transfer control device as defined in claim 14, further comprising:
   a packet division circuit which writes control information of the packet into a control information area of said storage memory and data of the packet into a data area of said storage memory, said storage memory being randomly accessible and being divided into the control information area and the data area; and
   an appending circuit which appends a data pointer indicating an address of data to be written to said data area, to said control information.

17. The data transfer control device as defined in claim 16, wherein said packet division circuit writes data of the packet obtained by shaping said series of said self-identification packets into an area within said storage memory that is dedicated to self-identification packets.

18. The data transfer control device as defined in claim 14, further comprising:
   a detecting circuit which detects whether or not the current period is a self-identification period, based on status information that has been sent from a lower layer;
   wherein said packet shaping circuit regards a series of packets that have been transferred in during said self-identification period as self-identification packets, and shapes said series of said self-identification packets.

19. The data transfer control device as defined in claim 1, further comprising:
   a packet division circuit which writes control information of the packet into a control information area of said storage memory and data of the packet into a data area of said storage memory, said storage memory being randomly accessible and being divided into the control information area and the data area; and
   an appending circuit which appends a data pointer indicating an address of data to be written to said data area, to said control information.

20. The data transfer control device as defined in claim 19, wherein said packet division circuit writes data of the packet obtained by shaping said series of said self-identification packets into an area within said storage memory that is dedicated to self-identification packets.

21. The data transfer control device as defined in claim 20, further comprising:
   a detecting circuit which detects whether or not the current period is a self-identification period, based on status information that has been sent from a lower layer;
   wherein said packet shaping circuit regards a series of packets that have been transferred in during said self-identification period as self-identification packets, and shapes said series of said self-identification packets.

22. The data transfer control device as defined in claim 20, wherein data transfer is performed in accordance with the IEEE 1394 standard.

23. The data transfer control device as defined in claim 19, further comprising:
   a detecting circuit which detects whether or not the current period is a self-identification period, based on status information that has been sent from a lower layer;
   wherein said packet shaping circuit regards a series of packets that have been transferred in during said self-identification period as self-identification packets, and shapes said series of said self-identification packets.

24. The data transfer control device as defined in claim 19, wherein data transfer is performed in accordance with the IEEE 1394 standard.

25. The data transfer control device as defined in claim 1, further comprising:
   a detecting circuit which detects whether or not the current period is a self-identification period, based on status information that has been sent from a lower layer;
   wherein said packet shaping circuit regards a series of packets that have been transferred in during said self-identification period as self-identification packets, and shapes said series of said self-identification packets.

26. The data transfer control device as defined in claim 25, wherein data transfer is performed in accordance with the IEEE 1394 standard.

27. The data transfer control device as defined in claim 1, wherein data transfer is performed in accordance with the IEEE 1394 standard.

28. Electronic equipment comprising:
   a data transfer control device as defined in claim 1;
   a device for performing given processing on data that has been received from another node via said data transfer control device and said bus; and
   a device for outputting or storing data that has been subjected to said processing.

29. Electronic equipment comprising:
   a data transfer control device as defined in claim 1;
   a device for performing given processing on data that is to be sent to another node via said data transfer control device and said bus; and
   a device for fetching data to be subjected to said processing.

30. A data transfer control method for transferring data among a plurality of nodes that are connected to a bus, the method comprising:
   receiving a series of self-identification packets that are transferred from said nodes,
   shaping said transferred series of said self-identification packets into a packet having a frame made of control information that is used by an upper layer and data that is formed from an assembly of said transferred series of said self-identification packets; and
   writing the shaped packet to a storage memory.

31. The data transfer control method as defined in claim 30, further comprising:
   erasing error check information within each of said self-identification packets when each of said self-identification packets comprises error check information; and
   shaping said transferred series of said self-identification packets into a packet having a frame made of data formed from an assembly of said self-identification packets each of which error check information has been erased, and said control information.

32. The data transfer control method as defined in claim 30, further comprising:
   appending status information to control information of the packet to indicate whether or not said self-identification packets were received during a self-identification period.

33. The data transfer control method as defined in claim 30, further comprising:

writing control information of the packet into a control information area of said storage memory and data of the packet into a data area of said storage memory, said storage memory being randomly accessible and being divided into the control information area and the data area; and appending a data pointer indicating an address of data to be written to said data area, to said control information.

34. The data transfer control method as defined in claim 30, further comprising:

detecting whether or not the current period is a self-identification period, based on status information that has been sent from a lower layer;

regarding a series of packets that have been transferred in during said self-identification period as self-identification packets; and shaping said series of said self-identification packets.

35. The data transfer control method as defined in claim 30, wherein data transfer is performed in accordance with the IEEE 1394 standard.

* * * * *